(12) United States Patent
Stafford

(10) Patent No.: US 10,828,560 B2
(45) Date of Patent: Nov. 10, 2020

(54) SYSTEMS AND METHODS FOR STEREOSCOPIC VISION WITH HEAD MOUNTED DISPLAY

(71) Applicant: Sony Interactive Entertainment Inc., Tokyo (JP)

(72) Inventor: Jeffrey Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 330 days.

(21) Appl. No.: 15/693,386

(22) Filed: Aug. 31, 2017

(65) Prior Publication Data

US 2018/0093176 A1    Apr. 5, 2018

Related U.S. Application Data

(60) Provisional application No. 62/403,009, filed on Sep. 30, 2016.

(51) Int. Cl.
*A63F 13/213* (2014.01)
*H04N 13/239* (2018.01)
(Continued)

(52) U.S. Cl.
CPC ............ *A63F 13/213* (2014.09); *A63F 13/25* (2014.09); *A63F 13/40* (2014.09); *A63F 13/52* (2014.09);
(Continued)

(58) Field of Classification Search
CPC ........ A63F 13/213; A63F 13/52; A63F 13/40; A63F 13/25; G02B 17/023;
(Continued)

(56) References Cited

U.S. PATENT DOCUMENTS 8,345,144 B1 * 1/2013 Georgiev
10,373,992 B1 * 8/2019 Hsu
(Continued)

FOREIGN PATENT DOCUMENTS

| DE | 102013020756 A1 | 6/2015 |
| KR | 20130022497 A | 3/2013 |
| WO | WO 2015183621 A1 | 12/2015 |

OTHER PUBLICATIONS

International Search Report and Written Opinion, PCT/US2017/052441, dated Dec. 7, 2017, 12 pages.

*Primary Examiner* — Chad M Dicke
(74) *Attorney, Agent, or Firm* — Panilla IP, APC

(57) ABSTRACT

An optical conveyance system is disclosed for relocating a visual input position of an electronic device. The electronic device has a frontside camera and a backside camera respectively positioned on opposite sides of the electronic device. An optical receiver is configured to receive visual input. An optical output is positioned over the frontside camera of the electronic device and is configured to project visual output into the frontside camera of the electronic device. An optical conveyance device is optically connected between the optical receiver and the optical output. The optical conveyance device is configured to convey the visual input received through the optical receiver to the optical output for projection as the visual output into the frontside camera of the electronic device.

21 Claims, 23 Drawing Sheets

(51) Int. Cl.
| | |
|---|---|
| *G03B 13/06* | (2006.01) |
| *G02B 23/08* | (2006.01) |
| *G03B 17/56* | (2006.01) |
| *G02B 27/01* | (2006.01) |
| *G02B 17/02* | (2006.01) |
| *G02B 30/34* | (2020.01) |
| *A63F 13/25* | (2014.01) |
| *A63F 13/40* | (2014.01) |
| *A63F 13/52* | (2014.01) |
| *H04N 13/344* | (2018.01) |

(52) U.S. Cl.
CPC ........... *G02B 17/023* (2013.01); *G02B 23/08* (2013.01); *G02B 27/0172* (2013.01); *G02B 30/34* (2020.01); *G03B 13/06* (2013.01); *G03B 17/565* (2013.01); *H04N 13/239* (2018.05); *H04N 13/344* (2018.05); *G02B 2027/0136* (2013.01); *G02B 2027/0138* (2013.01); *H04N 2213/001* (2013.01)

(58) Field of Classification Search
CPC ........... G02B 27/0172; G02B 27/2228; G02B 23/08; G02B 2027/0138; G02B 6/00; G03B 17/565; G03B 13/06; H04N 13/344; H04N 13/239; H04N 2213/001
See application file for complete search history.

(56) References Cited

U.S. PATENT DOCUMENTS

| | | | | |
|---|---|---|---|---|
| 10,416,455 | B2* | 9/2019 | Yi | G06F 3/011 |
| 10,460,445 | B2* | 10/2019 | Evertt | G06T 7/12 |
| 2008/0079839 | A1* | 4/2008 | Sung | |
| 2008/0143895 | A1* | 6/2008 | Peterka | G02B 27/0093 349/15 |
| 2012/0270600 | A1* | 10/2012 | Zelson | H04B 1/3888 455/556.1 |
| 2013/0127997 | A1* | 5/2013 | Inomoto | G02B 13/16 348/46 |
| 2014/0055746 | A1* | 2/2014 | Nistico | A61B 3/0008 351/206 |
| 2014/0369575 | A1* | 12/2014 | Riopka | G06K 9/00046 382/127 |
| 2015/0103146 | A1* | 4/2015 | Rose | H04N 13/239 348/47 |
| 2015/0172522 | A1* | 6/2015 | O'Neill | H04N 5/2252 348/240.3 |
| 2015/0348327 | A1* | 12/2015 | Zalewski | G06F 3/01 345/419 |
| 2015/0362733 | A1* | 12/2015 | Spivack | A63F 13/26 345/633 |
| 2016/0180591 | A1* | 6/2016 | Shiu | G02B 27/0172 345/633 |
| 2016/0267720 | A1 | 9/2016 | Mandella et al. | |
| 2016/0349509 | A1* | 12/2016 | Lanier | G02B 27/0172 |
| 2017/0097512 | A1* | 4/2017 | Haymond | G02B 27/2257 |
| 2017/0123217 | A1* | 5/2017 | Dukerschein | G02B 27/04 |
| 2017/0126937 | A1* | 5/2017 | Evans, V | H04N 5/2252 |
| 2017/0206691 | A1* | 7/2017 | Harrises | G02B 27/0172 |
| 2017/0307896 | A1* | 10/2017 | Kovaluk | G02B 27/0176 |
| 2017/0336915 | A1* | 11/2017 | Li | G06F 3/0418 |
| 2018/0017803 | A1* | 1/2018 | Chang | G02B 27/2242 |
| 2018/0292665 | A1* | 10/2018 | Al Zaydi | A63H 33/38 |
| 2019/0086674 | A1* | 3/2019 | Sinay | G02B 27/0172 |
| 2019/0086676 | A1* | 3/2019 | Reed | G02B 27/0176 |
| 2019/0109938 | A1* | 4/2019 | Jeong | H04M 1/72547 |
| 2019/0220002 | A1* | 7/2019 | Huang | B64C 39/024 |
| 2019/0289107 | A1* | 9/2019 | Hoellwarth | G02B 27/028 |

* cited by examiner

SYSTEMS AND METHODS FOR STEREOSCOPIC VISION WITH HEAD MOUNTED DISPLAY

CLAIM OF PRIORITY

This application claims priority under 35 U.S.C. 119(e) to U.S. Provisional Patent Application No. 62/403,009, filed Sep. 30, 2016. The disclosure of the above-identified patent application is incorporated herein by reference in its entirety.

BACKGROUND

The computing industry and the video game industry have seen many changes over the years. As computing power has expanded, developers of video games have created game software adapted to the increased computing power. To this end, video game developers have been coding games that incorporate sophisticated operations and mathematics to produce a very realistic game experience.

These games are presented as part of a gaming system including game consoles, portable game devices, and/or provided as services over a server or the cloud. As is well known, the game console is designed to connect to a monitor (usually a television) and enable user interaction through handheld controllers/input devices. A game console may include specialized processing hardware, including a central processing unit (CPU), a graphics processing unit (GPU) for processing intensive graphics operations, a vector unit for performing geometric transformations, and other glue hardware, firmware, and software. The game console may be further designed with an optical disc tray for receiving game compact discs for local play through the game console. Online and multi-player gaming is also possible, where a user can interactively play against or with other users over the Internet. As game complexity continues to intrigue players, game and hardware manufacturers have continued to innovate to enable additional and more realistic interactivity.

A growing trend in the computer gaming industry is to develop games that increase the interaction between the user and the gaming system. One way of accomplishing a richer interactive experience is to use wireless game controllers whose movement and gestures are tracked by the gaming system. These movements and gestures are used as inputs for the game. Gesture inputs, generally speaking, refer to having an electronic device such as a computing system, video game console, smart appliance, etc., react to some gesture made by the user while playing the game that are captured by the electronic device.

Another way of accomplishing a more immersive interactive experience is to use a head-mounted display (HMD). The HMD is worn by the user and can be configured to present various graphics, such as a view of a virtual space, in a display portion of the HMD. The graphics presented within the HMD can cover a large portion or even all of a user's field of view. Hence, the HMD can provide an immersive experience to the user. As connectivity to the Internet continues to increase, more configurations of HMD systems have been introduced.

The HMD can also be used in a virtual reality system in which a user becomes visually immersed in a computer generated three-dimensional virtual reality scene. In some applications, the entire virtual reality scene as displayed to the user is computer generated. In other applications, a portion of the virtual reality scene is computer generated, with another portion of the virtual reality scene corresponding to video and/or images of real-life objects and/or persons, where such real-life video/images can be rendered in the virtual reality scene in essentially real-time. Such applications may be referred to augmented reality applications. In some virtual reality applications, it is not only desirable to have the user feel visually immersed in the virtual reality scene, but it is also desirable to provide the user with an ability to select objects displayed within the virtual reality scene. It is within this context that the present invention arises.

SUMMARY

In an example embodiment, an optical conveyance system for relocating a visual input position of an electronic device is disclosed. The electronic device has a frontside camera and a backside camera respectively positioned on opposite sides of the electronic device. The optical conveyance system includes an optical receiver configured to receive visual input. The optical conveyance system also includes an optical output configured to project visual output. The optical output is positioned over the frontside camera of the electronic device to project visual output into the frontside camera of the electronic device. The optical conveyance system also includes an optical conveyance device optically connected between the optical receiver and the optical output. The optical conveyance device is configured to convey the visual input received through the optical receiver to the optical output for projection as the visual output into the frontside camera of the electronic device.

In an example embodiment, a method is disclosed for providing stereoscopic vision within a head-mounted display device. An electronic device is installed within the head-mounted display device. The electronic device has a display screen and a frontside camera on a front side of the electronic device and a backside camera on a back side of the electronic device. The head-mounted display device is configured to optically present images displayed on the display screen of the electronic device as immersive visual content. The method includes receiving a first visual input through the backside camera of the electronic device. The method also includes receiving a second visual input through an optical receiver positioned to have a field of view that overlaps a field of view of the backside camera of the electronic device. The method also includes optically conveying the second visual input through an optical conveyance device to an optical output positioned over the frontside camera of the electronic device so that the second visual input is projected into the frontside camera of the electronic device. The method also includes processing the first visual input received through the backside camera in conjunction with the second visual input, as received through the optical receiver and projected into the frontside camera, to provide stereoscopic vision within a real world environment corresponding to the combined fields of view of the backside camera and optical receiver.

Other aspects of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the presented subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

In some embodiments, a head mounted display device (HMD) is provided, which includes a slot or holder for receiving an electronic device, such as a smartphone or similar electronic device, so as to allow the screen of the electronic device to be the display device of the HMD. It should be understood that the electronic device for insertion into the HMD can be any type of electronic device that has a display screen for displaying visual content, and that is equipped to receive and/or generate content for display on the display screen, and that has a form factor suitable for insertion of the electronic device into the slot/holder of the HMD. In some embodiments, the electronic device referred to herein has wireless communication capability (e.g., telephone, cellular, Wi-Fi, Bluetooth, etc.). However, in some embodiments, the electronic device referred to herein may not have wireless communication capability.

Figure 1A:
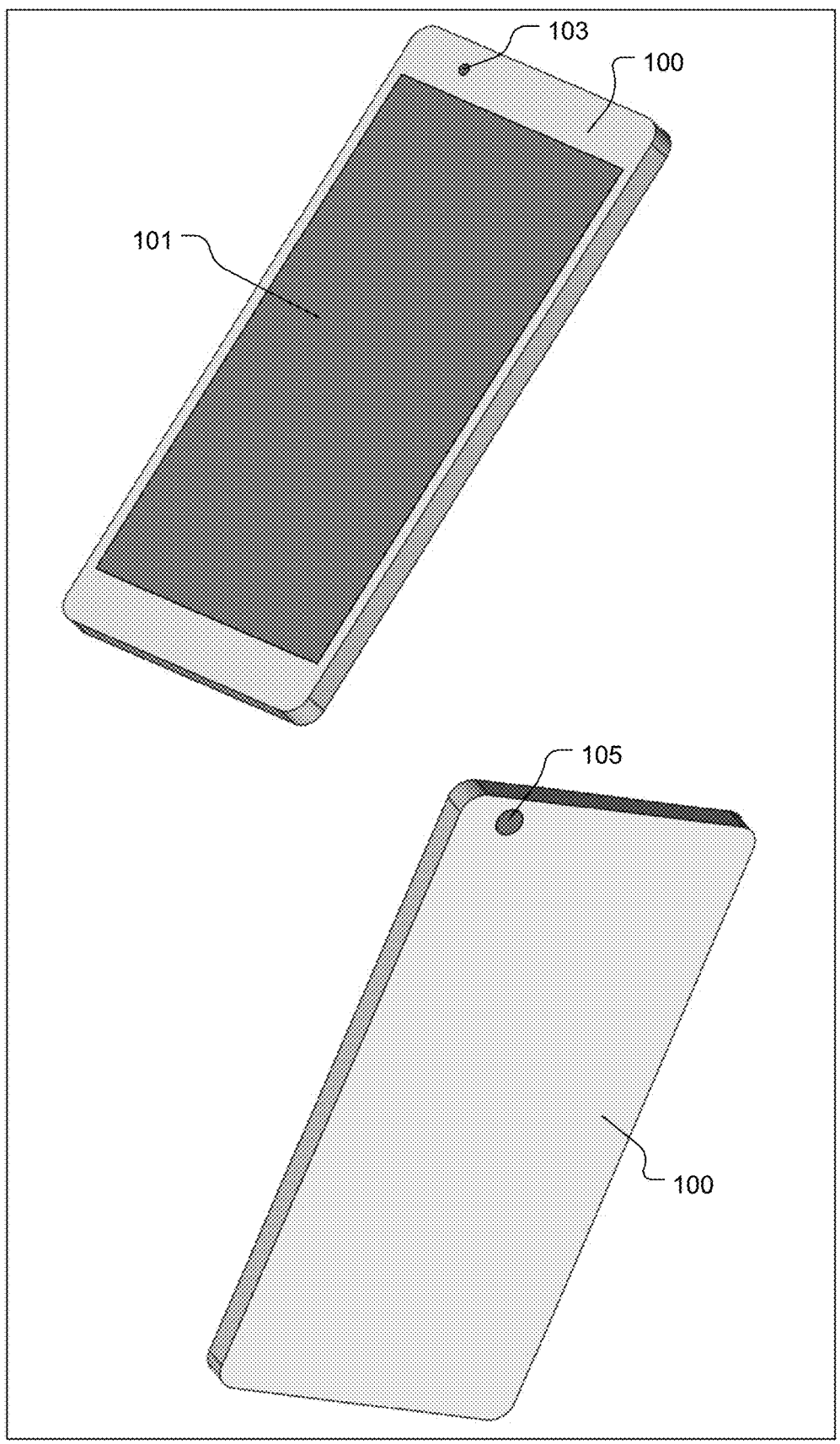
FIG. 1A shows a front view and a back view of an example electronic device, in accordance with some embodiments of the present invention.

FIG. 1A shows a front view and a back view of an example electronic device 100, in accordance with some embodiments of the present invention. As shown in the front view, the electronic device 100 includes a display screen 101 for displaying visual content, e.g., video, images, etc. Also, a frontside camera 103 is shown in the front view of the electronic device 100. The frontside camera 103 is configured to capture visual input within its range of view as still images and/or as video. As shown in the back view, the electronic device 100 also includes a backside camera 105 configured to capture visual input within its range of view as still images and/or as video. The electronic device 100 is configured to operate the frontside camera 103 and the backside camera 105 independently such that separate visual input can be captured and processed through both the frontside camera 103 and the backside camera 105 in a simultaneous manner.

Figure 1B:
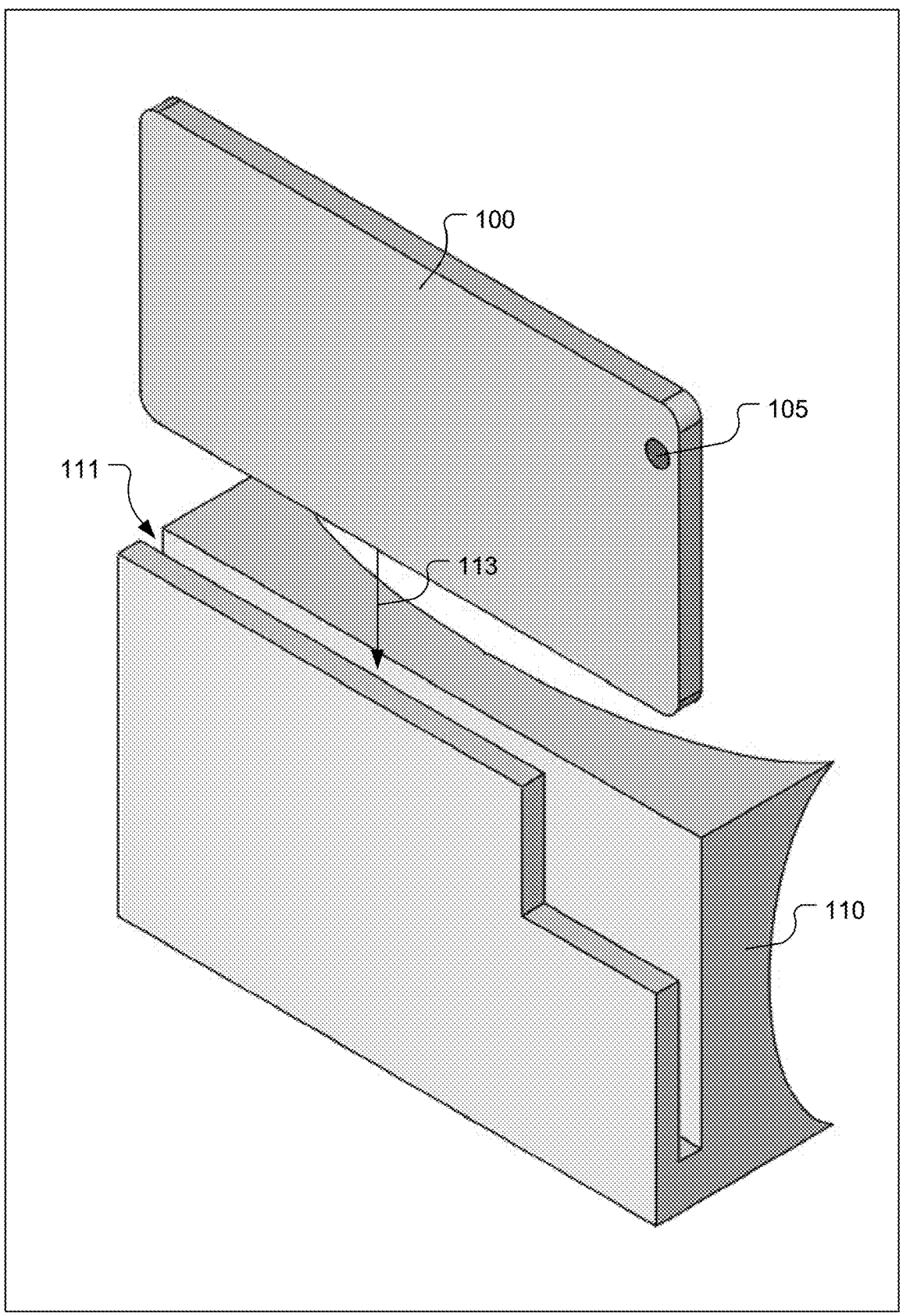
FIG. 1B shows a front view of the HMD with the electronic device positioned above the HMD, in accordance with some embodiments of the present invention.
Figure 1C:
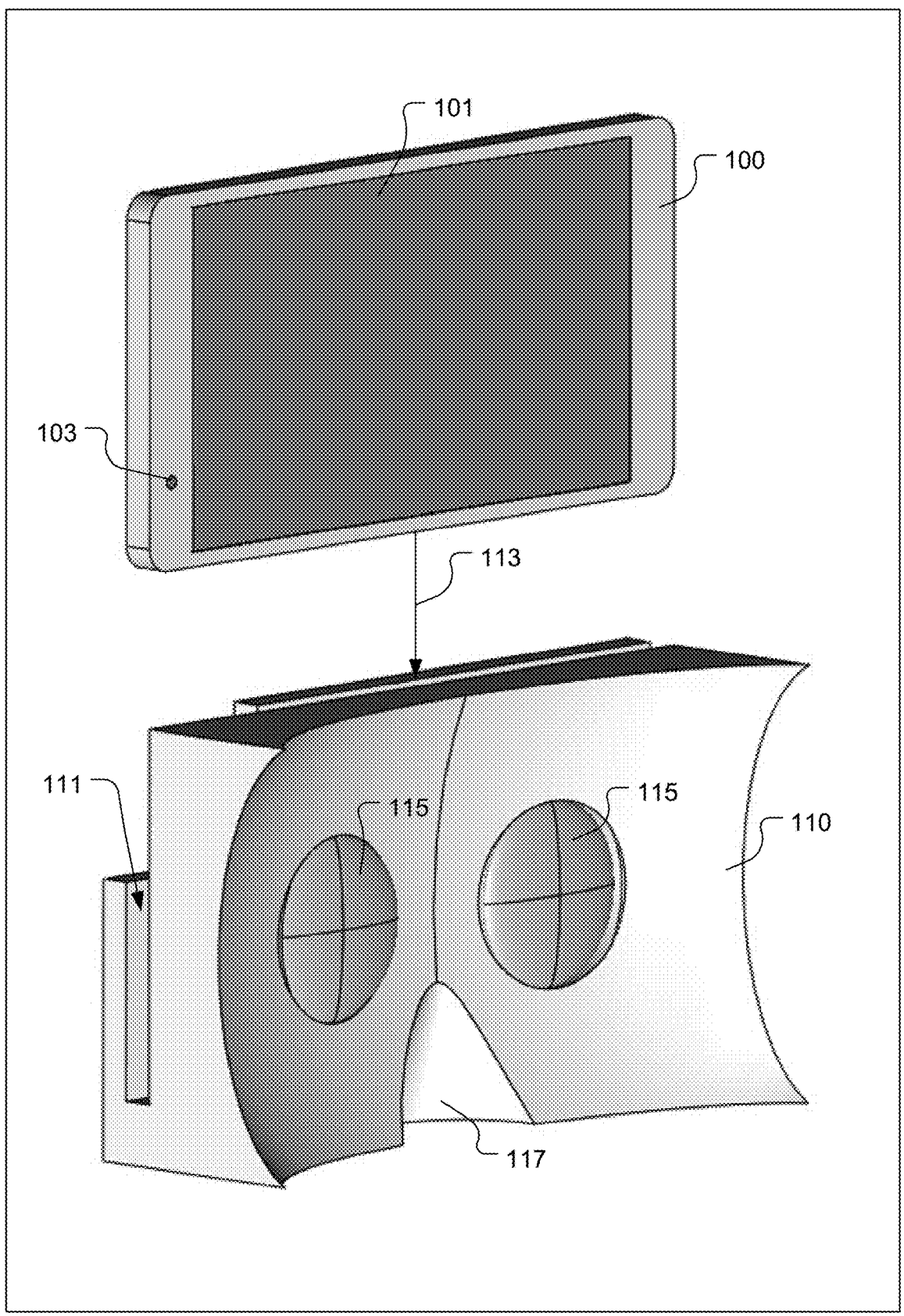
FIG. 1C shows a back view of the HMD with the electronic device positioned above the HMD, in accordance with some embodiments of the present invention.
Figure 1D:
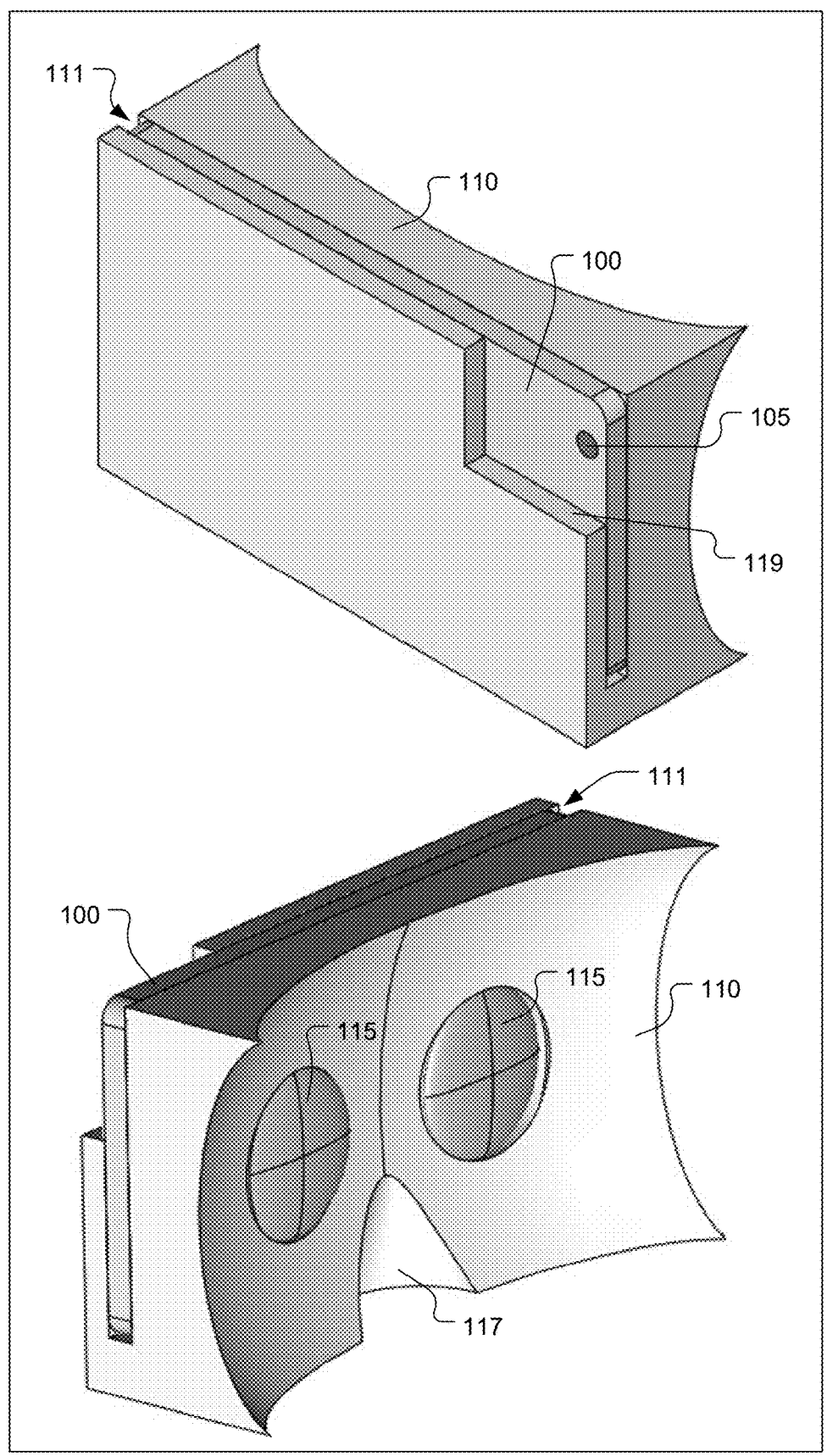
FIG. 1D shows the electronic device inserted into a slot/holder of the HMD, in accordance with some embodiments of the present invention.

FIGS. 1B and 1C shows an example HMD 110 with the electronic device 100 positioned above the HMD 110, in accordance with some embodiments of the present invention. Specifically, FIG. 1B shows a front view of the HMD 110 with the electronic device 100 positioned above the HMD 110, in accordance with some embodiments of the present invention. And, FIG. 1C shows a back view of the HMD 110 with the electronic device 100 positioned above the HMD 110, in accordance with some embodiments of the present invention. FIG. 1D shows the electronic device 100 inserted into a slot/holder 111 of the HMD 110, in accordance with some embodiments of the present invention. It should be understood that the shape and ergonomics of the HMD 110 can change depending on specific implementations. Thus, the example implementations of the HMD 110 as presented herein are just that, examples, which may be modified so long as they function to provide for immersive viewing of visual content shown on the display screen 101 of the electronic device 100.

The slot/holder 111 of the HMD 110 is configured to receive and hold the electronic device 100. The slot/holder 111 is also configured to include an opening/cutout 119 to provide a clear view for the backside camera 105 of the electronic device 100 when the electronic device 100 is inserted into the slot/holder 111. In some embodiments, the electronic device 100 can be inserted into the slot/holder 111 as indicated by arrow 113. However, it should be understood that in other embodiments, the slot/holder 111 can be configured to receive the electronic device 100 from essentially any direction of insertion. The HMD 110 itself does not include a display screen, but instead uses the display screen 101 of the electronic device 100, when the electronic device 100 is inserted or placed in the slot/holder 111 of the HMD 110. The HMD 110 can also include optics 115 for enabling viewing of the content rendered on the display screen 101 of the electronic device 100. It should be understood that the HMD 110 is configured to be worn over the eyes of its user, and in some embodiments can include a cutout 117 for positioning the HMD 110 on the user's nose. Also, the HMD 110 can include a strap or band or other type of device (not shown) for securing the HMD 110 to the user's head.

The electronic device 100 may be connected to electronics within the HMD 110 through wired and/or wireless connection(s). In some embodiments, the electronic device 100 can communicate with the Internet to access content, such as by streaming content or by downloading content, which can be rendered on the electronic device 100 when the electronic device 100 is inserted into the HMD 110. The HMD 110 can also include electronics for communicating with the electronic device 100 through wired and/or wireless connection(s).

In some embodiments, the content rendered on the display screen 101 of the electronic device 100 is distorted to produce three-dimensional (3D) images, and the optics 115 of the HMD 110 are configured to un-distort the 3D images so that the content displayed by the electronic device 100, when viewed through the optics 115 of the HMD 110, appear to be rich 3D visual content, such as images, videos, interactive data, etc. In some embodiments, the visual content rendered on the display screen 101 of the electronic device 100, when inserted into the HMD 110, includes images that can be processed by circuitry/algorithms within the HMD 110 to appear as 3D images.

The content rendered by the electronic device 100 when present within the HMD 110 can be for essentially any type of computer application, and may include one or more types of content such as game, movie, audio, images, multimedia, among others. In some embodiments, the content, or portions thereof, is generated by one or more applications executing on the electronic device 100. However, in some embodiments, the content, or portions thereof, is streamed from a remote content source over a network to the electronic device 100. And, in some embodiments, the content, or portions thereof, is streamed from a cloud gaming infrastructure over a network to the electronic device 100. The cloud gaming infrastructure may also direct various types of content to be transmitted from the remote content source over a network to the electronic device 100.

An example remote content source is an Internet website that provides downloadable content and/or streaming content. The content provided by the remote content source can include any type of multimedia content, such as movies, games, static/dynamic content, pictures, social media content, social media websites, etc. In some embodiments, content data is transmitted from the remote content sources to the electronic device 100, where the content data is then rendered by the electronic device 100 in a format suitable for display within the HMD 110.

In some embodiments, the HMD 110 is configured to provide a view into an interactive virtual reality scene of a computer application. For example, some computer applications that may support virtual reality scene generation and display through the HMD 110 include games (such as first person shooter games), virtual tours (such as hotels, travel sites, global placed of interest, augmented reality applications (such as for virtual meetings, collaboration between remote users, shared/synchronized virtual spaces), and augmented reality medical applications (such as remote examination, examination assistance, remote surgery, remote surgery assistance), among others. In the various computer applications, a user wearing the HMD 110 with the electronic device 100 present therein will be able to move their head in any direction to view other parts of the virtual reality scene. And, in the case of an interactive virtual reality scene, movement of the HMD 110 by way of movement of the user's head can be used to provide inputs to control movement of the user and/or other objects within the virtual reality scene, and/or take other actions within the virtual reality scene, such as zooming a view of the user in and out relative to an object present within the virtual reality scene.

Because the interactive content that can be rendered in the virtual reality scene in the HMD 110 is virtually boundless, a user is able to view and interact with the virtual reality scene in most every dimension. Tracking of the user's movement can include use of inertial sensors disposed within the HMD 110 and/or use of inertial sensors disposed within the electronic device 100. The inertial sensors can include one or more accelerometers (such as a MEMS inertial accelerometer, among others) and/or one or more gyroscopes (such as a ring laser gyroscope, a fiber optic gyroscope, a MEMS gyroscope, among others). Some implementations of the HMD 110 may include more or less inertial sensors. And, some implementations of the HMD 110 may not include any inertial sensors within the HMD 110 itself.

For ease of description, the term "inertial sensor" as used herein refers to any type of inertial sensor that is capable of detecting/sensing movement of itself without an external reference. The inertial sensor generates inertial sensor data that provides information about the direction and rate of movement of the inertial sensor. The inertial sensor data can be analyzed to determine the direction and rate of movement of the HMD 110 and/or of the electronic device 100 present within the HMD 110, which in turn can be analyzed to determine the direction and rate of movement of the user wearing the HMD 110. In this manner, movements of the user as determined through analysis of the inertial sensor data can be used as inputs to the computer application executing to generate and render the virtual reality scene.

Therefore, through analysis of the inertial sensor data, the user is able to act as a human controller to affect specific actions within the interactive virtual reality scene. And, in some embodiments, the movements of the user and corresponding actions within the virtual reality scene can be naturally related to each other. For example, inertial sensor data indicating a lean forward by the user may be used by the computer application as an input to cause the user's viewpoint to move forward within the virtual reality scene. It should be appreciated that the types of user movement and corresponding actions within the virtual reality scene are essentially limitless, depending on the range of possible movements of the human body and the context of any given virtual reality scene.

Figure 2A:
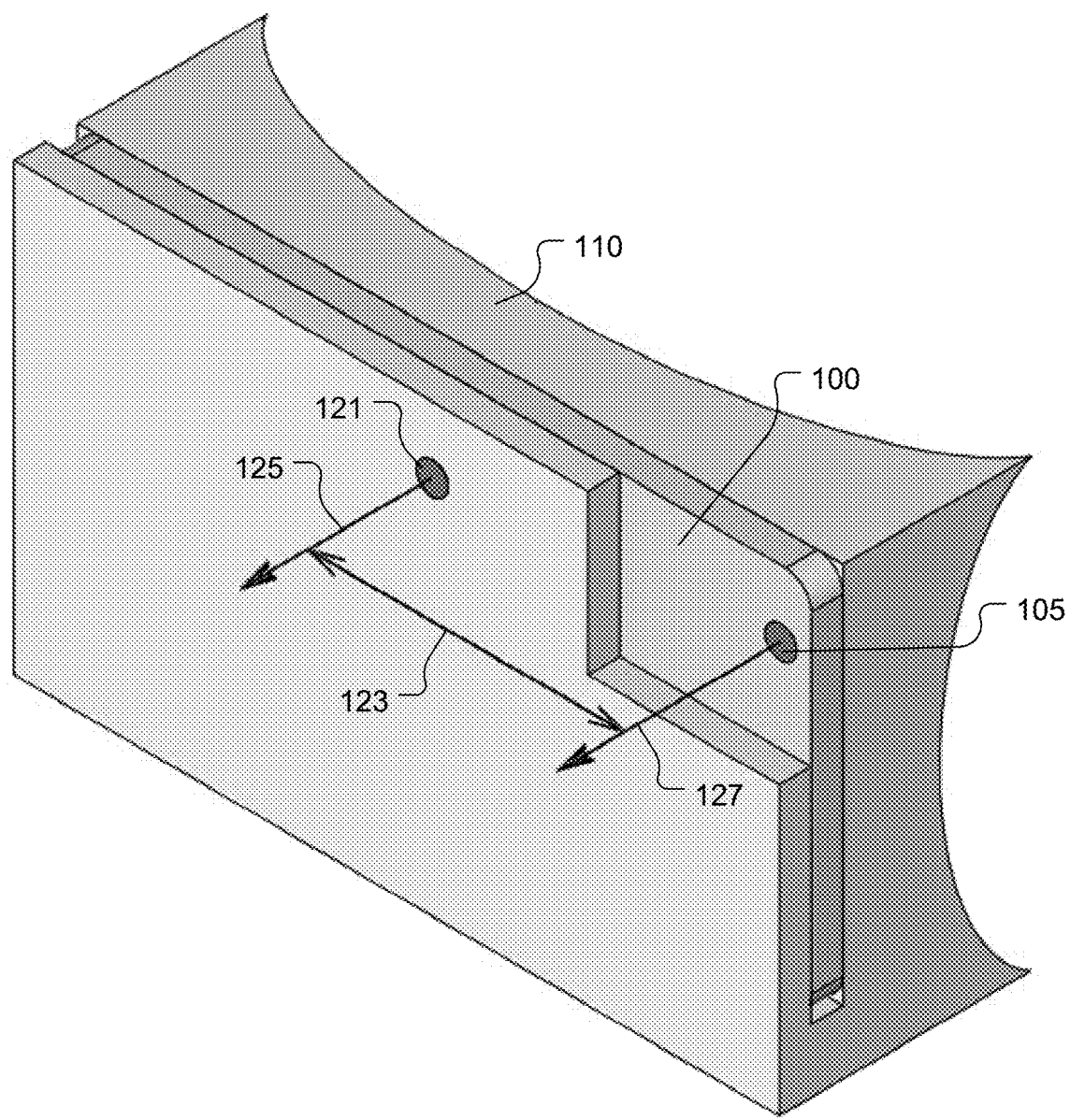
FIG. 2A shows a perspective view of the HMD with the electronic device inserted in the HMD, in accordance with some embodiments of the present invention.

FIG. 2A shows a perspective view of the HMD 110 with the electronic device 100 inserted in the HMD 110, in accordance with some embodiments of the present invention. In the configuration of FIG. 2A, the HMD 110 includes an optical receiver 121 positioned at a separation distance 123 from the backside camera 105. In some embodiments, the frontside camera 103 of the electronic device 100 is optically connected to the optical receiver 121 such that visual input received through the optical receiver 121 is optically conveyed to the frontside camera 103. The optical receiver 121 is spatially oriented and exposed to have an optical view axis 125 substantially parallel to an optical view axis 127 of the backside camera 105. The separation distance 123 is measured perpendicularly between the optical view axis 125 of the optical receiver 121 and the optical view axis 127 of the backside camera 105. In some embodiments, the separation distance 123 is about 63 millimeters (mm), which corresponds to an average distance between pupils of adult human eyes. However, in other embodiments, the separation distance 123 can be either less than or greater than 63 mm. And, in some embodiments, the position of the optical receiver 121 is adjustable, so that the separation distance 123 is adjustable.

Images received through the backside camera 105 of the electronic device 100 can be processed in conjunction with the images received through the frontside camera 103 of the electronic device 100 (by way of the optical receiver 121 and optical connection between the optical receiver 121 and frontside camera 103) to provide stereoscopic vision with depth perception of the real world present around the user. It should be understood that when the user is wearing the HMD 110 with the electronic device 100 inserted into the HMD 110, the user is fully immersed in the visual content displayed on the display screen 101 of the electronic device 100, and the user is unable to see the real world present around them. In various embodiments, the electronic device 100 is configured to process images received through the frontside camera 103 (by way of the optical receiver 121) and the backside camera 105 to determine locations of objects in the real world relative to the user of the HMD 110.

In some embodiments, optical properties of the optical receiver 121 can be configured to substantially match optical properties of the lens of the backside camera 105. The optical properties can include zoom setting and angle of view, among essentially any other optical property that characterizes the lens and/or optical components of the backside camera 105. Also, in some embodiments, optical properties of the optical receiver 121 can be configured to be intentionally different from optical properties of the lens and/or optical components of the backside camera 105. By configuring the optical properties of the optical receiver 121 to differ from the optical properties of the lens and/or optical components of the backside camera 105, correct optically-created stereo vision can be achieved within the HMD 110. Also, by configuring the optical properties of the optical receiver 121 to differ from the optical properties of the lens and/or optical components of the backside camera 105, it is possible to provide a mechanism for a dual-lens system to various applications executed for display within the HMD 110. In various embodiments, applications that may benefit from the dual-lens system can include improved photos/videos and improved object/hand detection, and can include wide, near, and long range narrow data for HMD/Phone Simultaneous Localization and Mapping (SLAM), among other improvements.

With stereoscopic vision capability, the electronic device 100 can be configured to accurately identify objects near the user in the real world and accurately determine both location and distance from the user to these identified objects. The electronic device 100 can also be configured to provide information to the user wearing the HMD 110 about the objects that are identified in the real world around the user. The information about objects present in the real world around the user can be conveyed to the user in many ways. For example, in some embodiments, objects identified in the real world can be shown on the display screen 101 of the electronic device 100. And, in some embodiments, the presence of objects identified in the real world can be communicated to the user through audible communication and/or through other types of visual communication by way of the display screen 101 of the electronic device 100 and/or through tactile communication, such as vibration, and/or through other forms of communication.

In some embodiments, identifying objects in the real world with depth perception provided by way of the stereoscopic vision mentioned above can improve safety of the user as the user moves physically within the real world while wearing the HMD 110. Also, in some embodiments, identifying objects in the real world with depth perception provided by way of the stereoscopic vision mentioned above can improve interactivity of the user with augmented reality applications in which the user's hand or other hand-held devices are moved within the real world to cause interaction with virtual objects displayed within the immersive visual content on the display screen 101 of the electronic device 100. And, in some embodiments, identifying objects in the real world with depth perception provided by way of the stereoscopic vision mentioned above can improve tracking of movement of the HMD 110. For example, in some embodiments, data about the accurate identification of objects and the accurate location and distance to the objects relative to the HMD 110, as provided through the stereoscopic vision mentioned above, can be combined with other HMD tracking data, such as inertial sensor data, to improve tracking of movement of the HMD 110, which can in turn be used to improve navigation of the user's viewpoint through the immersive visual content shown through the display screen 101 of the electronic device 100.

It should be understood that in order to achieve the stereoscopic vision, it is necessary to convey the visual input received through the optical receiver 121 around to the frontside camera 103 of the electronic device 100. This can be done in many different ways depending on the configuration of the HMD 110 and the configuration of the electronic device 100. In the example HMD 110 configuration of FIG. 2A, the optical receiver 121 is disposed within the HMD 110.

Figure 2B:
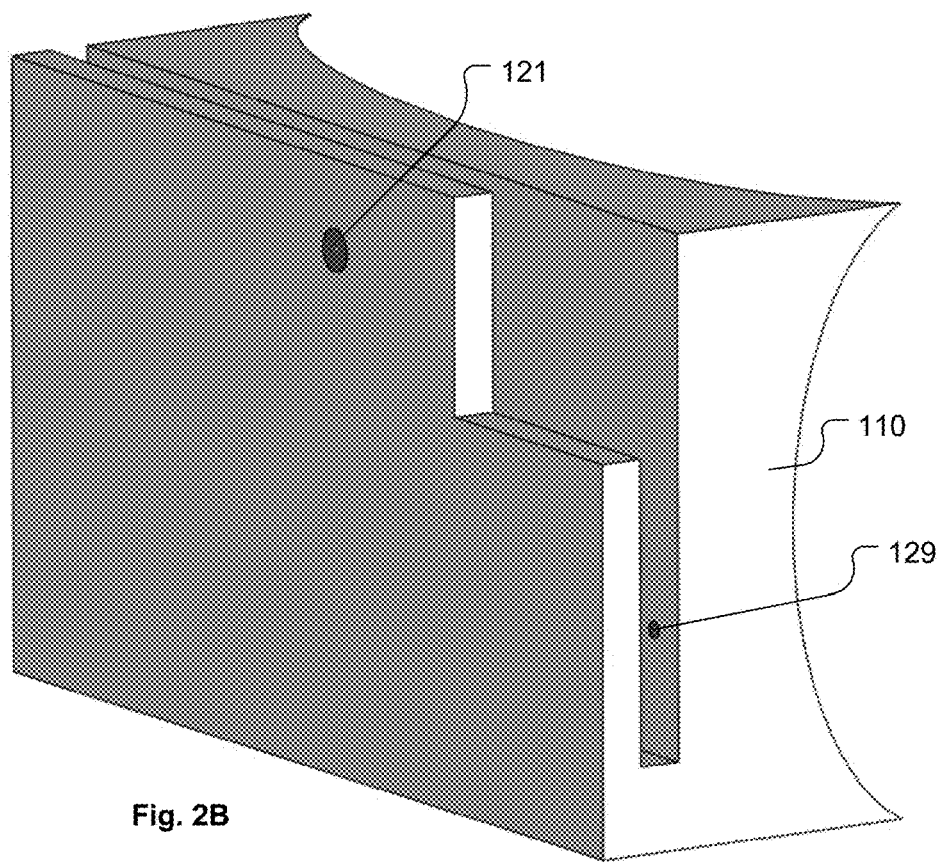
FIG. 2B shows a perspective view of the HMD as shown in FIG. 2A, in accordance with some embodiments of the present invention.

FIG. 2B shows a perspective view of the HMD 110 as shown in FIG. 2A, in accordance with some embodiments of the present invention. In FIG. 2B, both the optical receiver 121 and an optical output 129 are shown. The optical output 129 is positioned such that when the electronic device is inserted into the HMD 110, the optical output 129 is positioned directly next to/over the frontside camera 103 of the electronic device 100. In this manner, visual input received through the optical receiver 121 is optically conveyed to the optical output 129, and is in turn optically conveyed from the optical output 129 to the frontside camera 103 of the electronic device 100.

Figure 2C:
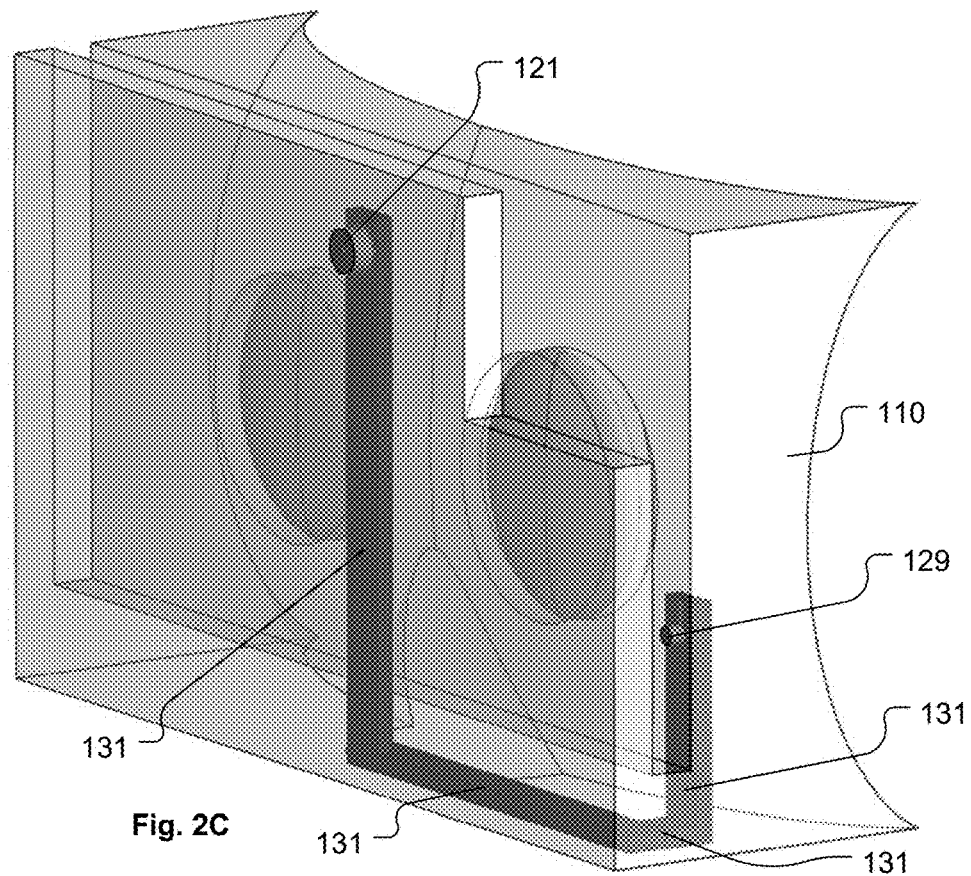
FIG. 2C shows a transparent view of the HMD as shown in FIG. 2B, in accordance with some embodiments of the present invention.

FIG. 2C shows a transparent view of the HMD 110 as shown in FIG. 2B, in accordance with some embodiments of the present invention. As shown in FIG. 2C, the optical receiver 121 is optically connected to the optical output 129 through an optical conveyance device 131. It should be understood that in some embodiments the HMD 110 can include additional circuitry and components that are not shown in the transparent view of FIG. 2C in order to avoid obscuring embodiments of the present invention. In some embodiments, the optical conveyance device 131 includes a combination of mirrors, waveguides, and/or prisms for projecting the visual input received through the optical receiver 121 onto a lens of the frontside camera 103. In some embodiments, the optical conveyance device 131 includes a bundle of optical fibers configured to transmit light received through the optical receiver 121 around to the optical output 129. It should be understood that in various embodiments, the optical conveyance device 131 can be configured in different ways, so long as the visual input received through the optical receiver 121 is transmitted through the optical output 129 and onto the lens of the frontside camera 103, so as to obtain the same effect as if the frontside camera 103 were positioned and oriented in the same manner as the optical receiver 121.

In some embodiments, the optical conveyance device 131 is fully integrated within the HMD 110, such that the optical conveyance device 131 is not exposed outside of the HMD 110. However, in some embodiments, a portion of the optical conveyance device 131 may be exposed at the exterior surface of the HMD 110. For example, if the optical conveyance device 131 includes a focusing component, that focusing component may be exposed at the exterior surface of the HMD 110 to provide for focus adjustment. Also, it should be understood that the optical conveyance device 131 can include optical components, such as optical amplifiers, optical splitters, optical combiners, etc., as needed to accomplish conveyance of the visual input received through the optical receiver 121 around to the optical output 129.

Figure 2E:
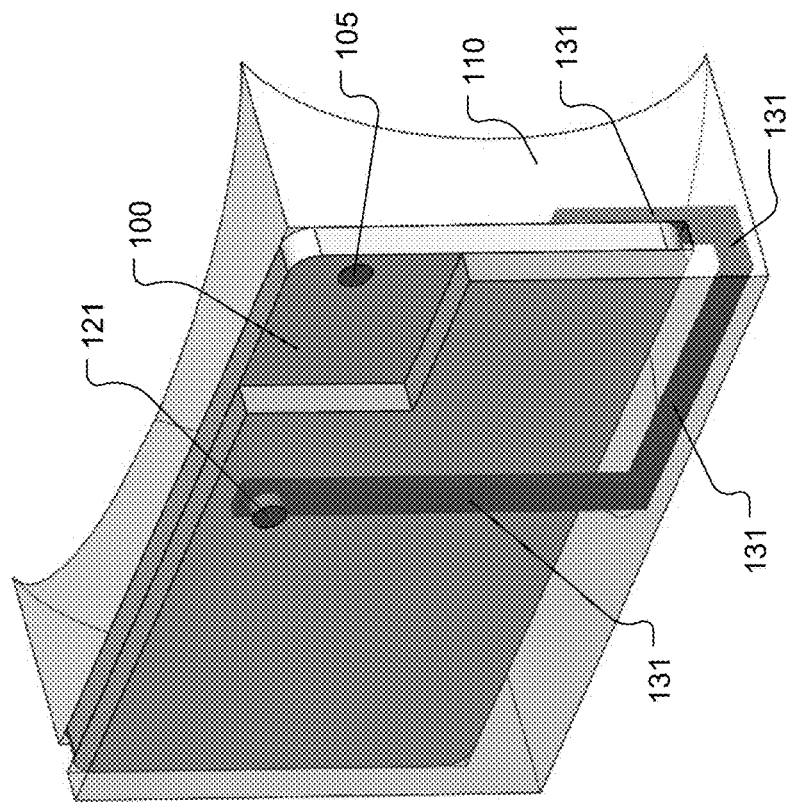
FIG. 2E shows a transparent view of the HMD with electronic device therein as shown in FIG. 2D, in accordance with some embodiments of the present invention.
Figure 2D:
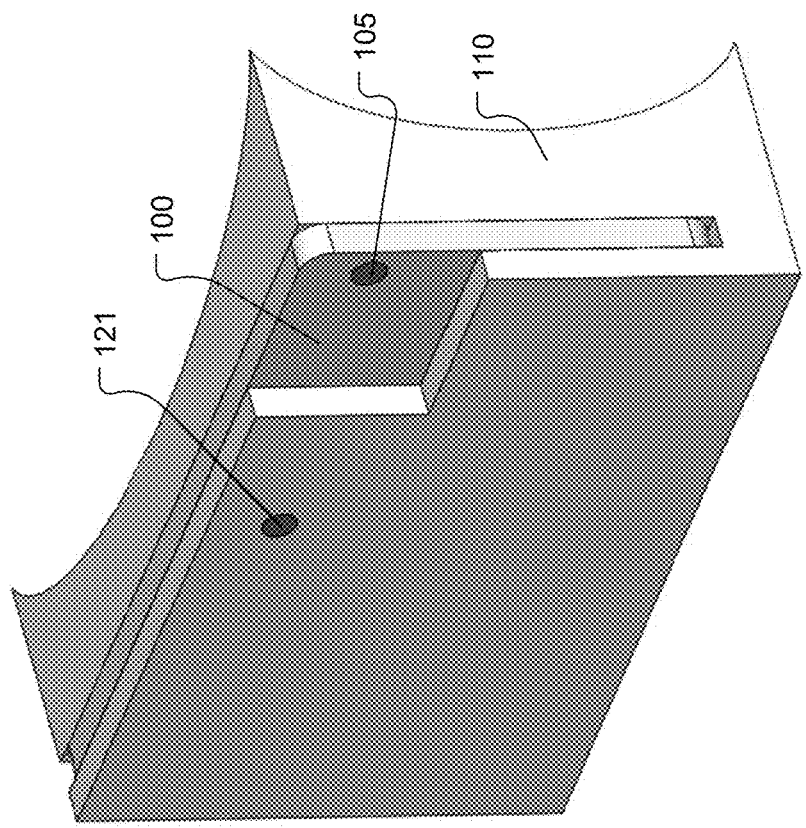
FIG. 2D shows a front perspective of the HMD as shown in FIG. 2B with the electronic device inserted into the HMD, in accordance with some embodiments of the present invention.
Figure 2G:
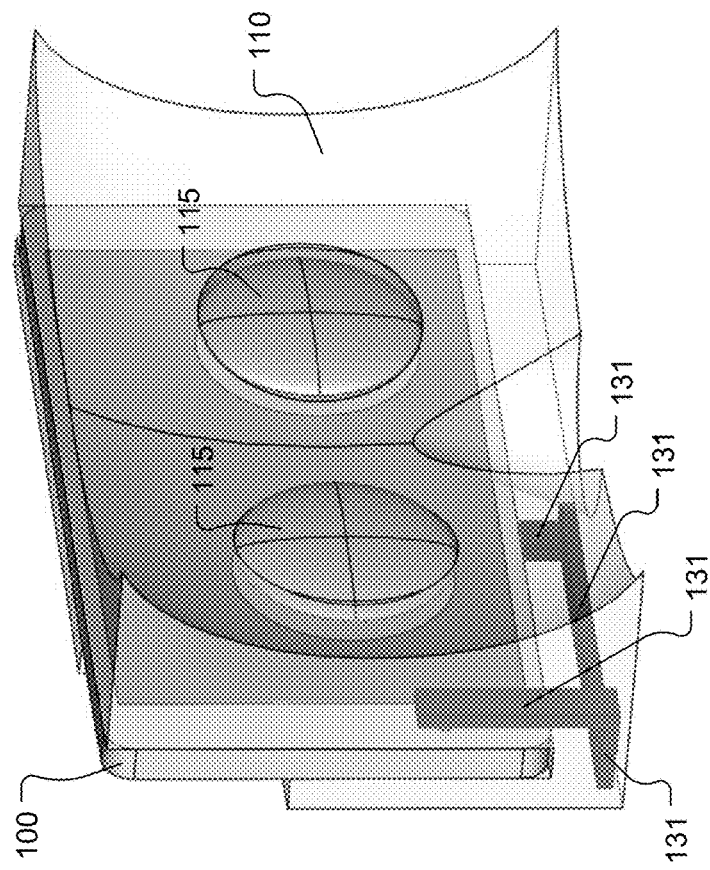
FIG. 2G shows a transparent view of the HMD with electronic device therein as shown in FIG. 2F, in accordance with some embodiments of the present invention.
Figure 2F:
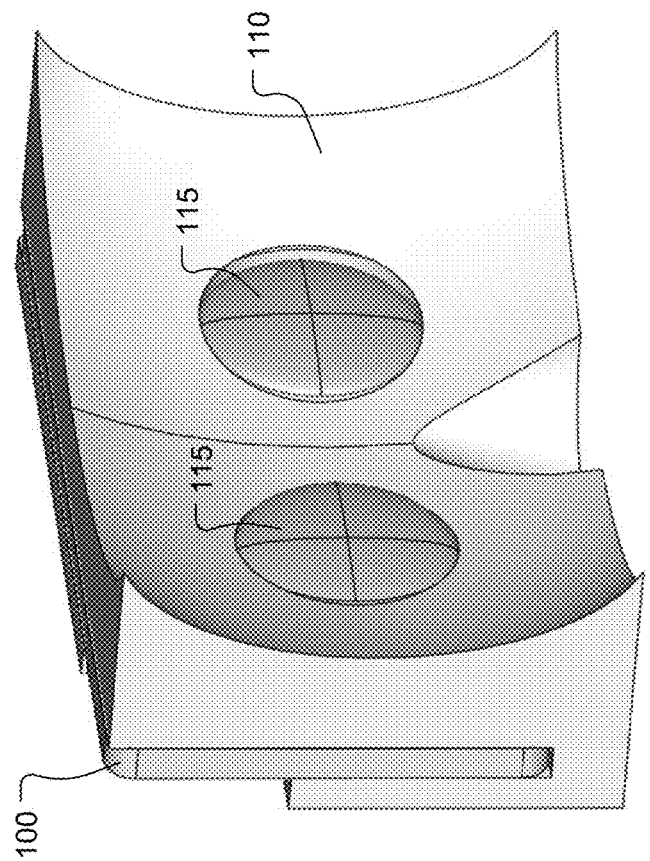
FIG. 2F shows a back perspective of the HMD as shown in FIG. 2B with the electronic device inserted into the HMD, in accordance with some embodiments of the present invention.

FIG. 2D shows a front perspective of the HMD 110 as shown in FIG. 2B with the electronic device 100 inserted into the HMD 110, in accordance with some embodiments of the present invention. FIG. 2E shows a transparent view of the HMD 110 with electronic device 100 therein as shown in FIG. 2D, in accordance with some embodiments of the present invention. It should be understood that in some embodiments the HMD 110 can include additional circuitry and components that are not shown in the transparent view of FIG. 2E in order to avoid obscuring embodiments of the present invention. FIG. 2F shows a back perspective of the HMD 110 as shown in FIG. 2B with the electronic device 100 inserted into the HMD 110, in accordance with some embodiments of the present invention. FIG. 2G shows a transparent view of the HMD 110 with electronic device 100 therein as shown in FIG. 2F, in accordance with some embodiments of the present invention. It should be understood that in some embodiments the HMD 110 can include additional circuitry and components that are not shown in the transparent view of FIG. 2G in order to avoid obscuring embodiments of the present invention.

Figure 3A:
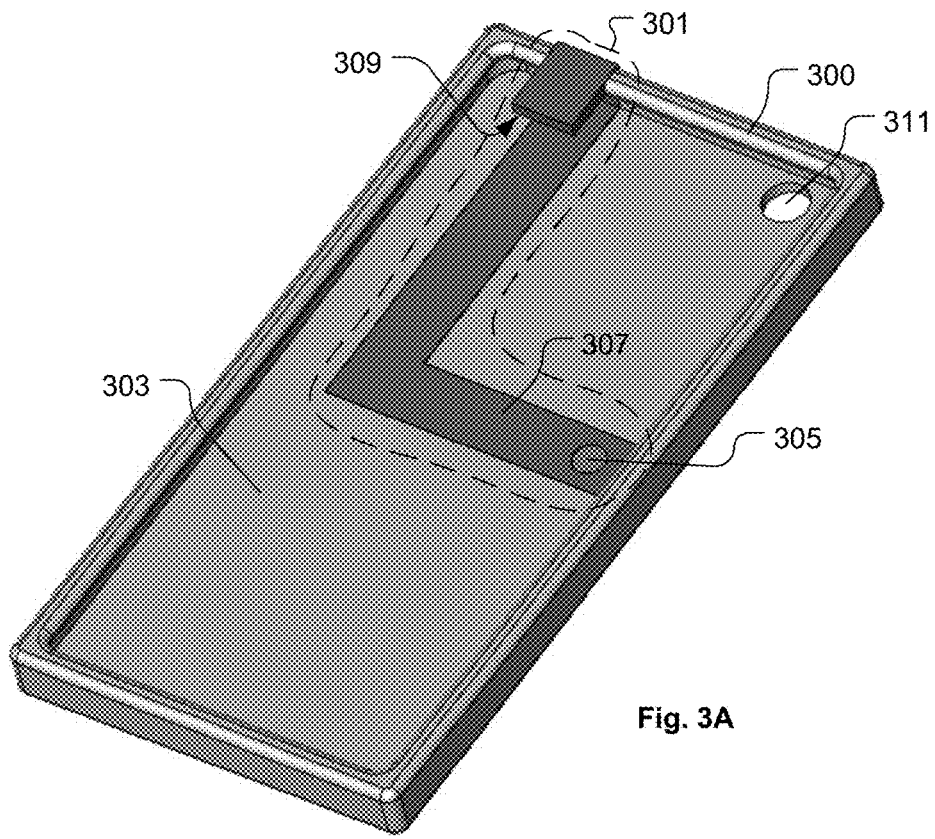
FIG. 3A shows a front view of a case for the electronic device with an optical conveyance system disposed within the case, in accordance with some embodiments of the present invention.
Figure 3B:
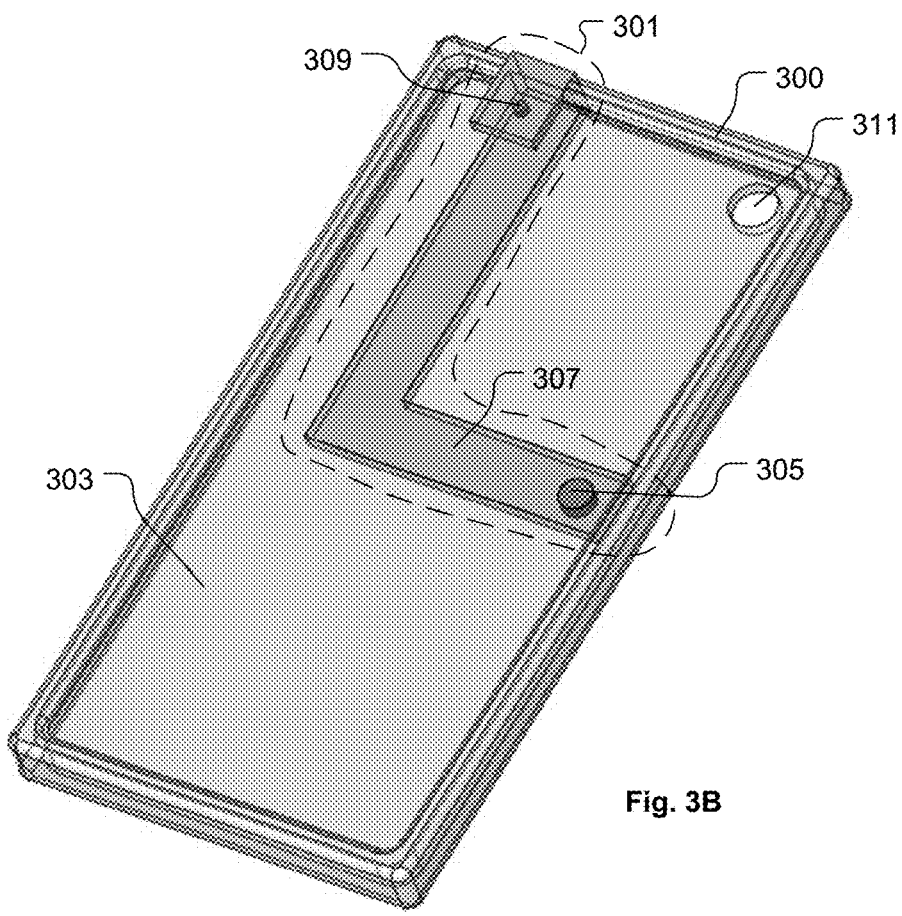
FIG. 3B is a transparent version of the case as shown in FIG. 3A, in accordance with some embodiments of the present invention.

The embodiments shown in FIGS. 2A through 2G have the optical receiver 121, the optical conveyance device 131, and the optical output 129 embedded within the HMD 110. However, it should be understood that in other embodiments, the visual input at the optical receiver 121 can be optically conveyed to the frontside camera 103 of the electronic device 100 without involvement by the HMD 110 itself. For example, FIG. 3A shows a front view of a case 300 for the electronic device 100 with an optical conveyance system 301 disposed within the case 300, in accordance with some embodiments of the present invention. FIG. 3B is a transparent version of the case 300 as shown in FIG. 3A, in accordance with some embodiments of the present invention. The case 300 includes a cavity 303 formed to receive the electronic device 100. The optical conveyance system 301 includes an optical receiver 305, an optical conveyance device 307, and an optical output 309, configured to convey visual input received at the optical receiver 305 through the optical conveyance device 307 to the optical output 309 and out into the lens of the frontside camera of the electronic device 100. The case 300 also includes an opening 311 to provide a clear view for the backside camera 105 of the electronic device 100.

Figure 3C:
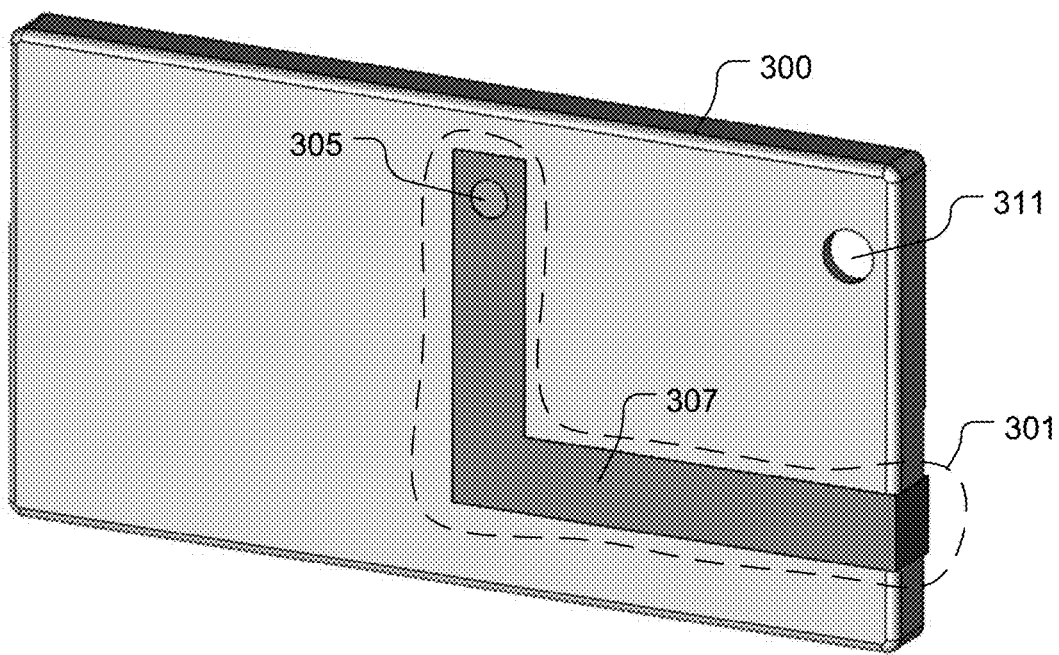
FIG. 3C shows a back view of the case for the electronic device with the optical conveyance system disposed within the case, in accordance with some embodiments of the present invention.
Figure 3D:
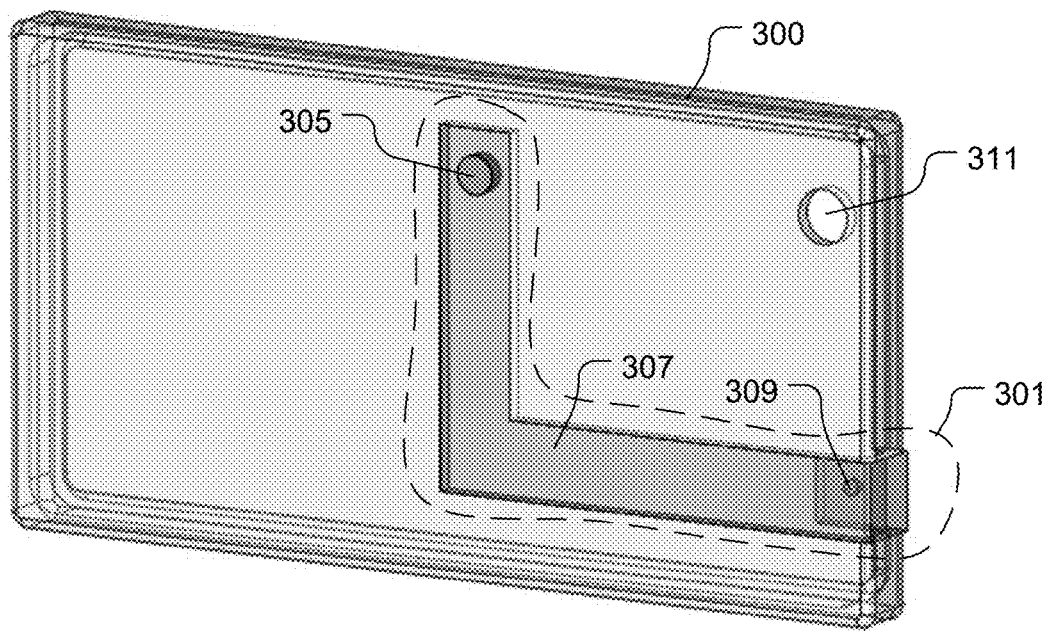
FIG. 3D is a transparent version of the case as shown in FIG. 3C, in accordance with some embodiments of the present invention.
Figure 3E:
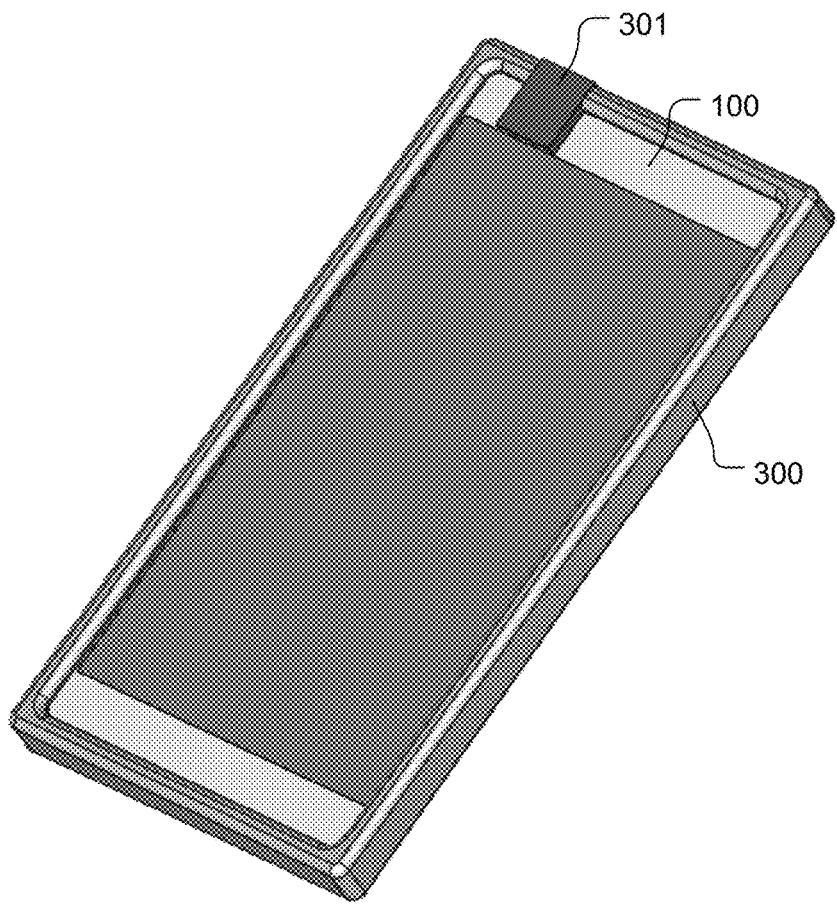
FIG. 3E shows a perspective view of the front of the case with the electronic device inserted into the case, in accordance with some embodiments of the present invention.
Figure 3F:
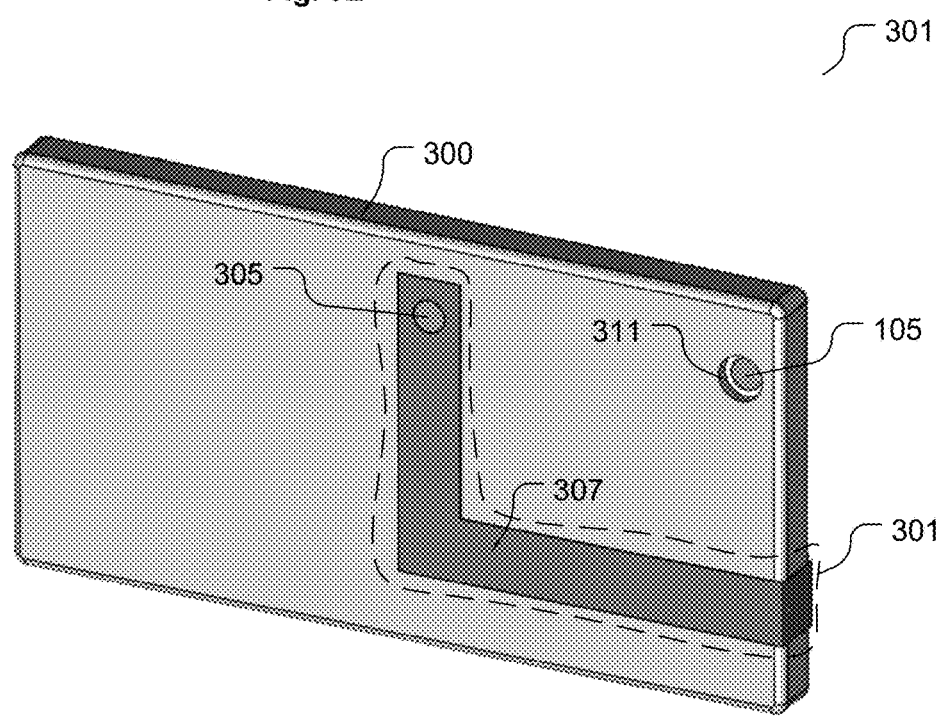
FIG. 3F shows a perspective view of the back side of the case with the electronic device inserted into the case, in accordance with some embodiments of the present invention.

FIG. 3C shows a back view of the case 300 for the electronic device 100 with the optical conveyance system 301 disposed within the case 300, in accordance with some embodiments of the present invention. FIG. 3D is a transparent version of the case 300 as shown in FIG. 3C, in accordance with some embodiments of the present invention. FIG. 3E shows a perspective view of the front of the case 300 with the electronic device 100 inserted into the case 300, in accordance with some embodiments of the present invention. The optical conveyance system 301 extends over the front of the electronic device 100 so that the optical output 309 is positioned over the frontside camera 103 of the electronic device 100. FIG. 3F shows a perspective view of the back side of the case 300 with the electronic device 100 inserted into the case 300, in accordance with some embodiments of the present invention. The optical receiver 305 is exposed at the backside of the case 300 to receive visual input. Also, the backside camera 105 of the electronic device 100 is exposed at the backside of the case 300.

In some embodiments, the optical conveyance device 307 includes a combination of mirrors, waveguides, and/or prisms for projecting the visual input received through the optical receiver 305 onto the lens of the frontside camera 103 of the electronic device. In some embodiments, the optical conveyance device 307 includes a bundle of optical fibers configured to transmit light received through the optical receiver 305 around to the optical output 309. It should be understood that in various embodiments, the optical conveyance device 307 can be configured in different ways, so long as the visual input received through the optical receiver 305 is transmitted through the optical output 309 and onto the lens of the frontside camera 103 of the electronic device 100, so as to obtain the same effect as if the frontside camera 103 were positioned and oriented in the same manner as the optical receiver 305.

Figure 3G:
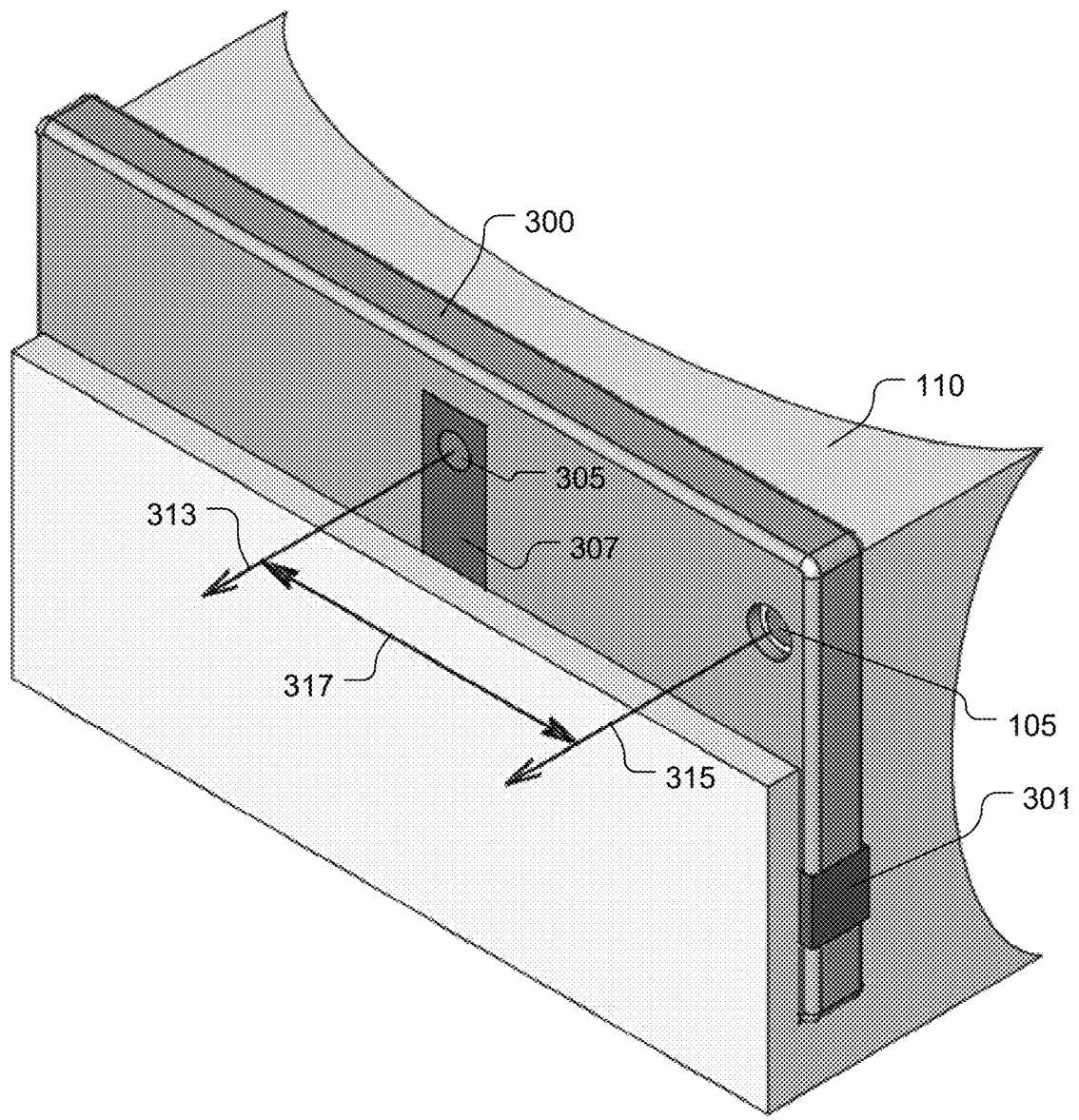
FIG. 3G shows the case, with the electronic device inserted therein, inserted into the HMD, in accordance with some embodiments of the present invention.

FIG. 3G shows the case 300, with the electronic device 100 inserted therein, inserted into the HMD 110, in accordance with some embodiments of the present invention. The HMD 110 in this embodiment is configured to provide a clear view for both the backside camera 105 of the electronic device 100 and the optical receiver 305. The optical receiver 305 is spatially oriented and exposed to have an optical view axis 313 substantially parallel to an optical view axis 315 of the backside camera 105. A separation distance 317 is measured perpendicularly between the optical view axis 313 of the optical receiver 305 and the optical view axis 315 of the backside camera 105. In some embodiments, the separation distance 317 is about 63 millimeters (mm), which corresponds to the average distance between pupils of adult human eyes. However, in other embodiments, the separation distance 317 can be either less than or greater than 63 mm.

Figure 4A:
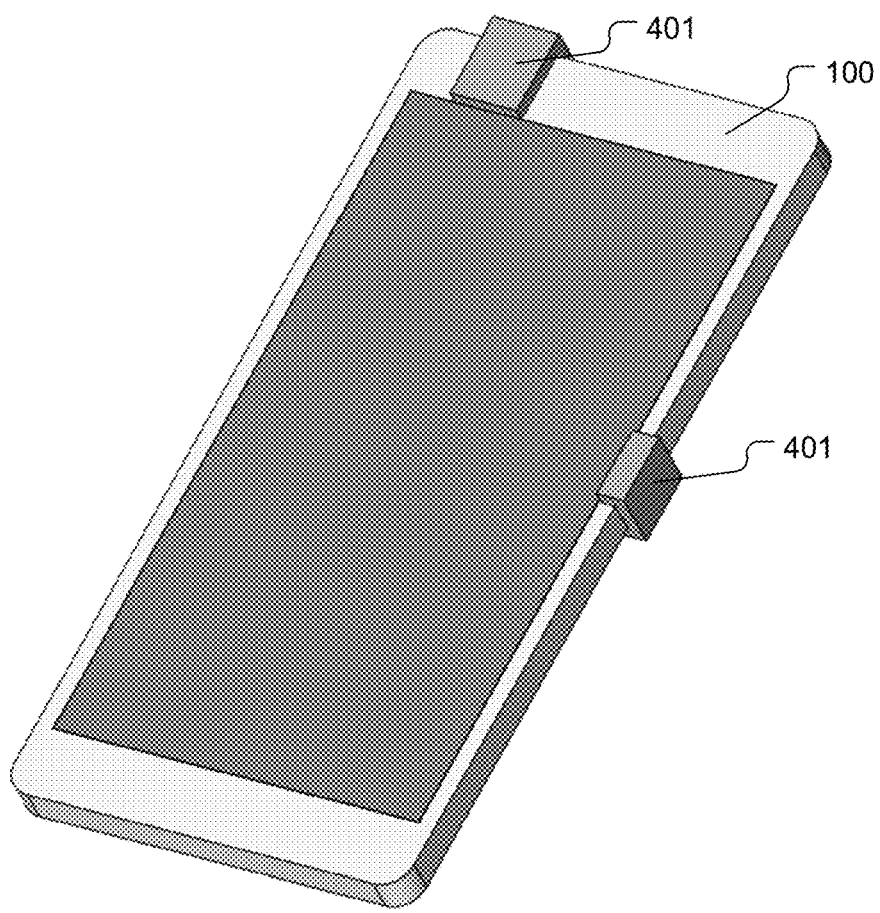
FIG. 4A shows a front view of the electronic device with an optical conveyance system attached to the electronic device, in accordance with some embodiments of the present invention.
Figure 4B:
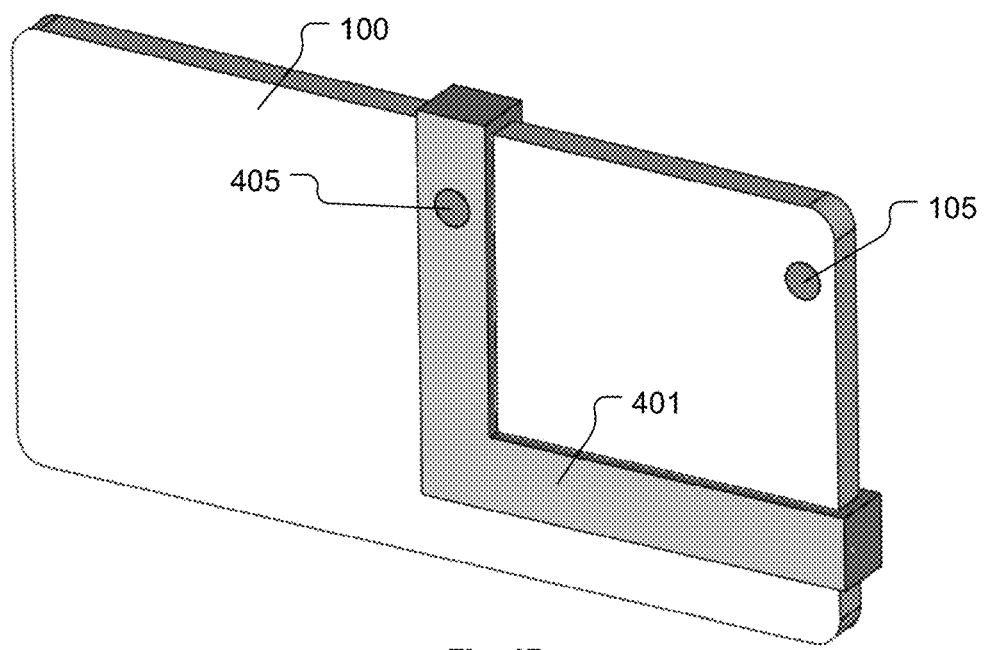
FIG. 4B shows a back view of the electronic device with the optical conveyance system attached to the electronic device, in accordance with some embodiments of the present invention.
Figure 4C:
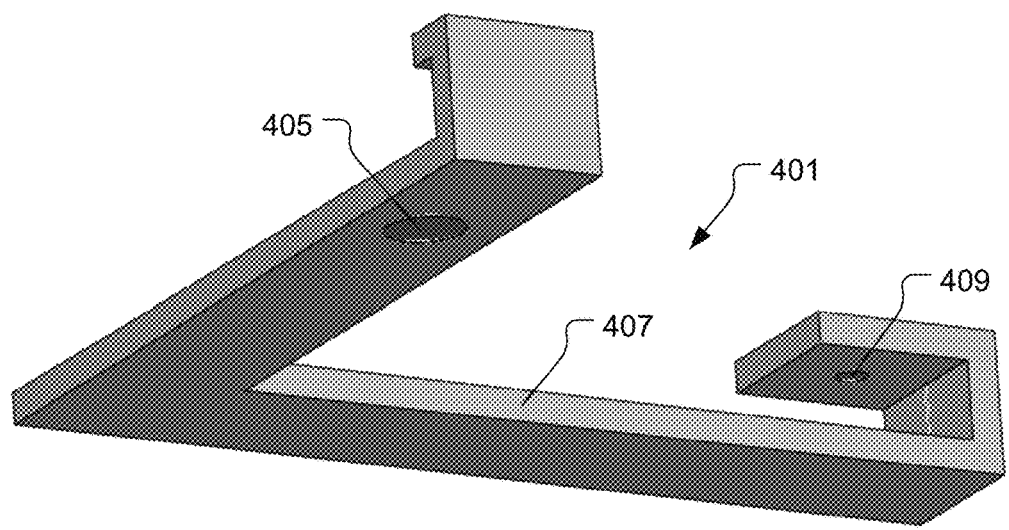
FIG. 4C shows the optical conveyance system detached from the electronic device, in accordance with some embodiments of the present invention.

FIG. 4A shows a front view of the electronic device 100 with an optical conveyance system 401 attached to the electronic device 100, in accordance with some embodiments of the present invention. FIG. 4B shows a back view of the electronic device 100 with the optical conveyance system 401 attached to the electronic device 100, in accordance with some embodiments of the present invention. FIG. 4C shows the optical conveyance system 401 detached from the electronic device 100, in accordance with some embodiments of the present invention. In some embodiments, the optical conveyance system 401 has a clip-on configuration so that when the optical conveyance system 401 is attached to the electronic device 100 there is essentially no free movement of the optical conveyance system 401 relative to the electronic device 100. The optical conveyance system 401 includes an optical receiver 405, an optical conveyance device 407, and an optical output 409, configured to convey visual input received at the optical receiver 405 through the optical conveyance device 407 to the optical output 409 and out into the lens of the frontside camera 103 of the electronic device 100.

In some embodiments, the optical conveyance device 407 includes a combination of mirrors, waveguides, and/or prisms for projecting the visual input received through the optical receiver 405 onto the lens of the frontside camera 103 of the electronic device 100. In some embodiments, the optical conveyance device 407 includes a bundle of optical fibers configured to transmit light received through the optical receiver 405 around to the optical output 409. It should be understood that in various embodiments, the optical conveyance device 407 can be configured in different ways, so long as the visual input received through the optical receiver 405 is transmitted through the optical output 409 and onto the lens of the frontside camera 103 of the electronic device 100, so as to obtain the same effect as if the frontside camera 103 were positioned and oriented in the same manner as the optical receiver 405.

Figure 4D:
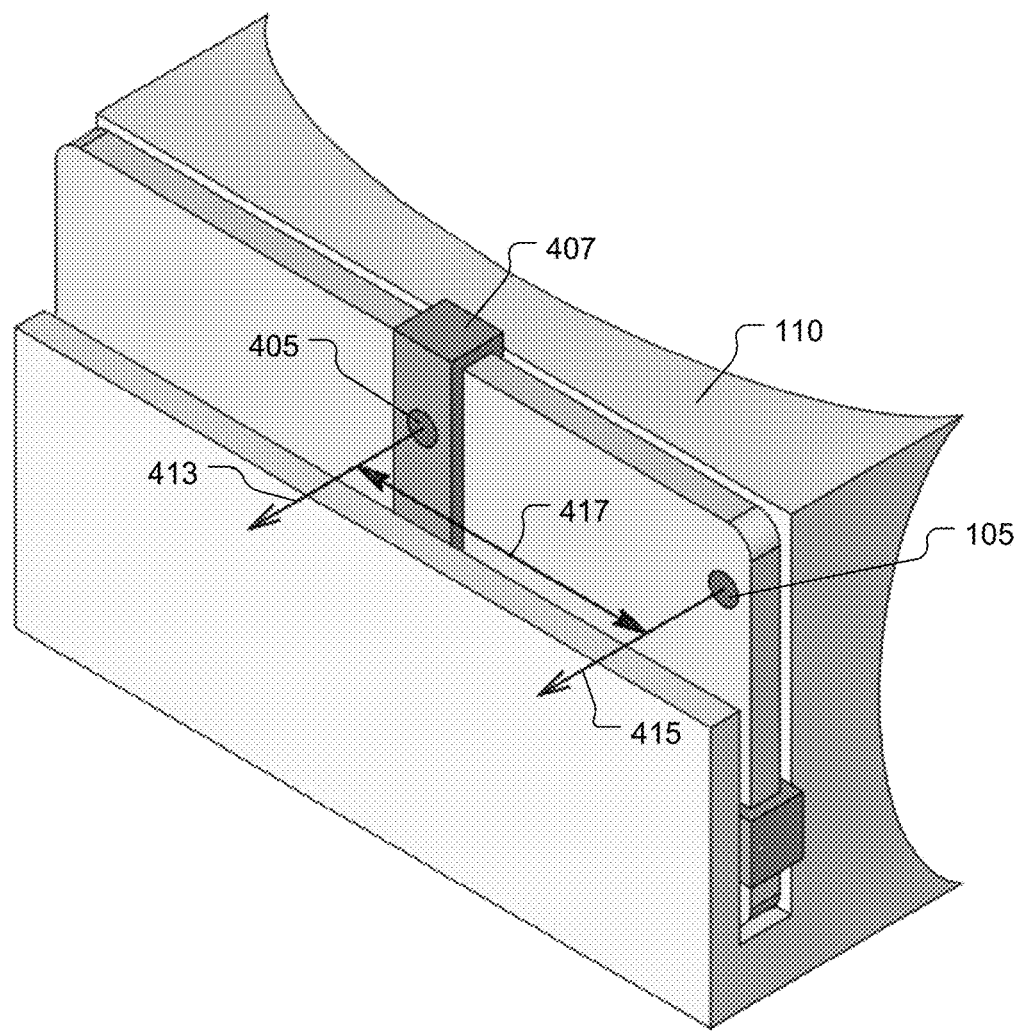
FIG. 4D shows the optical conveyance device attached to the electronic device, with the electronic device inserted into the HMD, in accordance with some embodiments of the present invention.

FIG. 4D shows the optical conveyance device 407 attached to the electronic device 100, with the electronic device 100 inserted into the HMD 110, in accordance with some embodiments of the present invention. The HMD 110 in this embodiment is configured to provide a clear view for both the backside camera 105 of the electronic device 100 and the optical receiver 405. The optical receiver 405 is spatially oriented and exposed to have an optical view axis 413 substantially parallel to an optical view axis 415 of the backside camera 105. A separation distance 417 is measured perpendicularly between the optical view axis 413 of the optical receiver 405 and the optical view axis 415 of the backside camera 105. In some embodiments, the separation distance 417 is about 63 millimeters (mm), which corresponds to the average distance between pupils of adult human eyes. However, in other embodiments, the separation distance 417 can be either less than or greater than 63 mm.

Figure 5A:
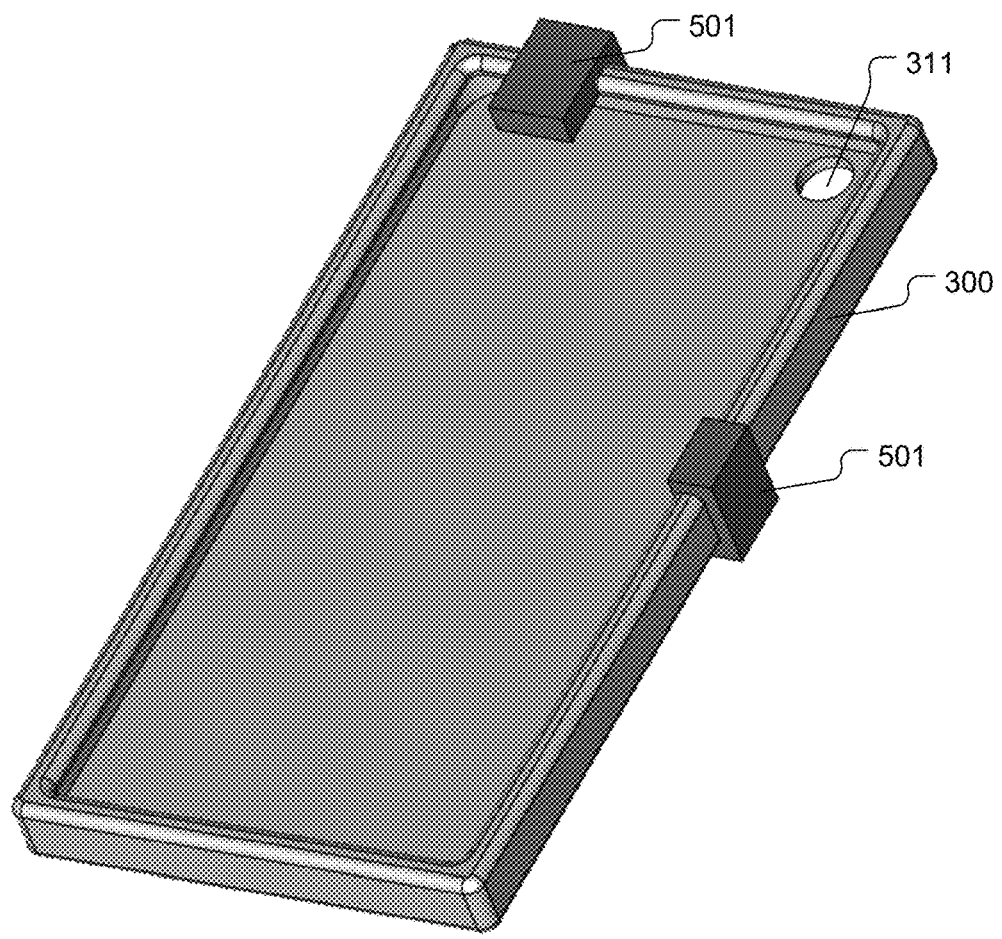
FIG. 5A shows a front view of the case with an optical conveyance system attached to the case, in accordance with some embodiments of the present invention.
Figure 5B:
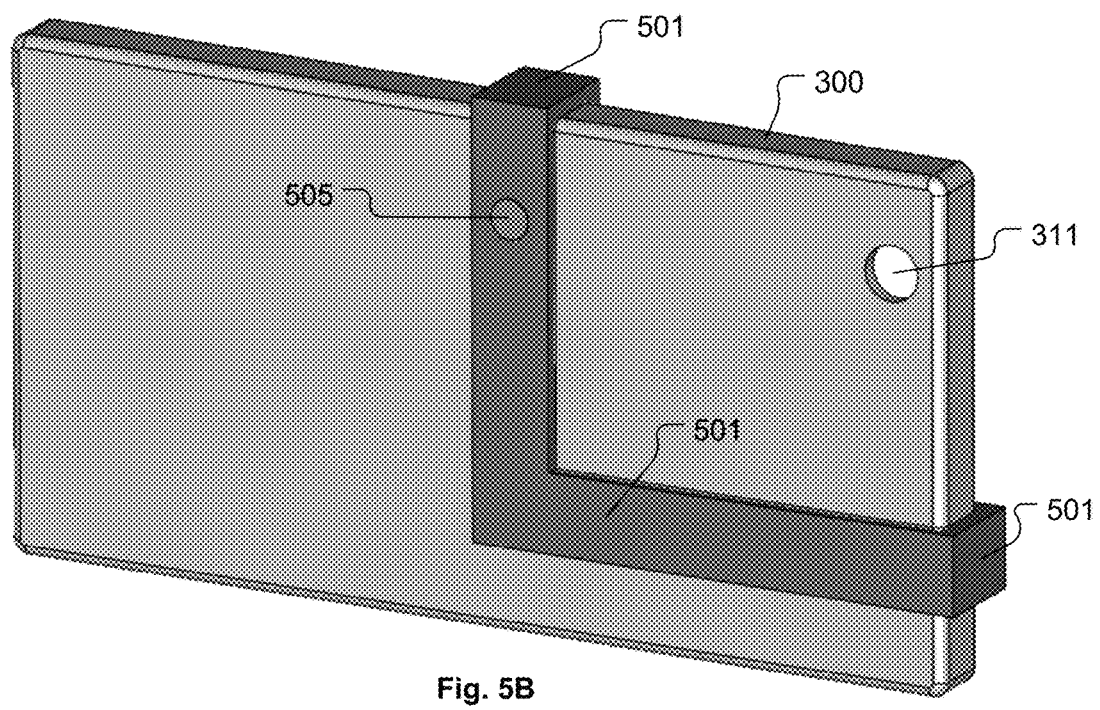
FIG. 5B shows a back view of the case with the optical conveyance system attached to the case, in accordance with some embodiments of the present invention.
Figure 5C:
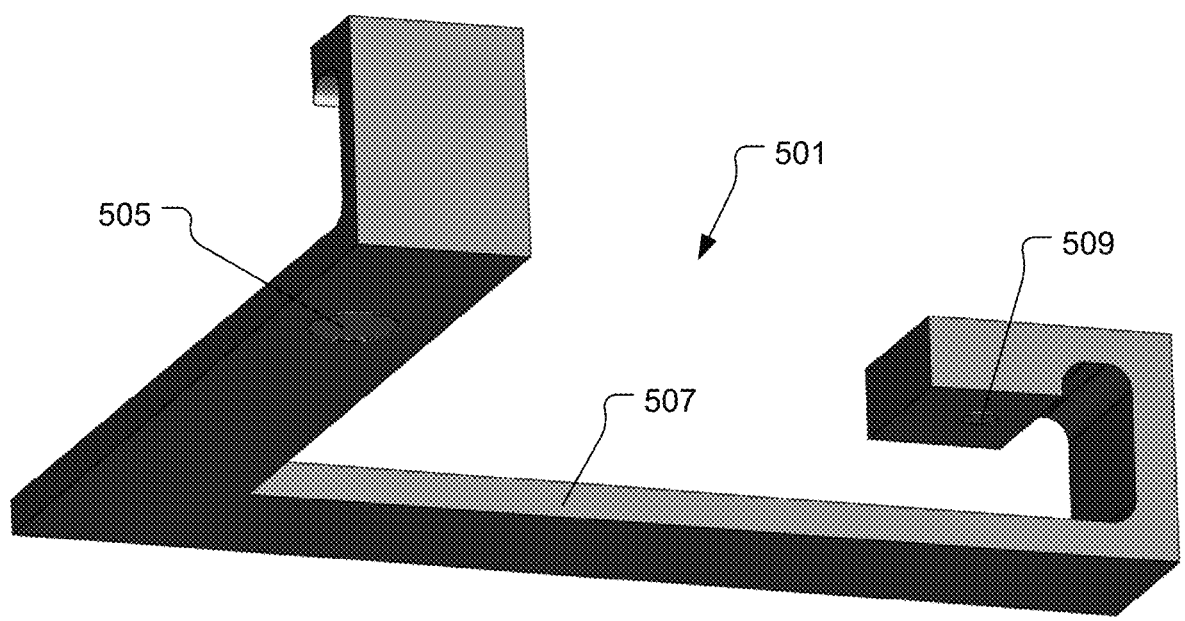
FIG. 5C shows the optical conveyance system detached from the case, in accordance with some embodiments of the present invention.

FIG. 5A shows a front view of the case 300 with an optical conveyance system 501 attached to the case 300, in accordance with some embodiments of the present invention. FIG. 5B shows a back view of the case 300 with the optical conveyance system 501 attached to the case 300, in accordance with some embodiments of the present invention. FIG. 5C shows the optical conveyance system 501 detached from the case 300, in accordance with some embodiments of the present invention. In some embodiments, the optical conveyance system 501 has a clip-on configuration so that when the optical conveyance system 501 is attached to the case 300 there is essentially no free movement of the optical conveyance system 501 relative to the case 300. The optical conveyance system 501 includes an optical receiver 505, an optical conveyance device 507, and an optical output 509, configured to convey visual input received at the optical receiver 505 through the optical conveyance device 507 to the optical output 509 and out into the lens of the frontside camera 103 of the electronic device 100, when the electronic device 100 is installed within the case 300.

In some embodiments, the optical conveyance device 507 includes a combination of mirrors, waveguides, and/or prisms for projecting the visual input received through the optical receiver 505 onto the lens of the frontside camera 103 of the electronic device 100. In some embodiments, the optical conveyance device 507 includes a bundle of optical fibers configured to transmit light received through the optical receiver 505 around to the optical output 509. It should be understood that in various embodiments, the optical conveyance device 507 can be configured in different ways, so long as the visual input received through the optical receiver 505 is transmitted through the optical output 509 and onto the lens of the frontside camera 103 of the electronic device 100, when the electronic device 100 is installed in the case 300, so as to obtain the same effect as if the frontside camera 103 were positioned and oriented in the same manner as the optical receiver 505.

Figure 5D:
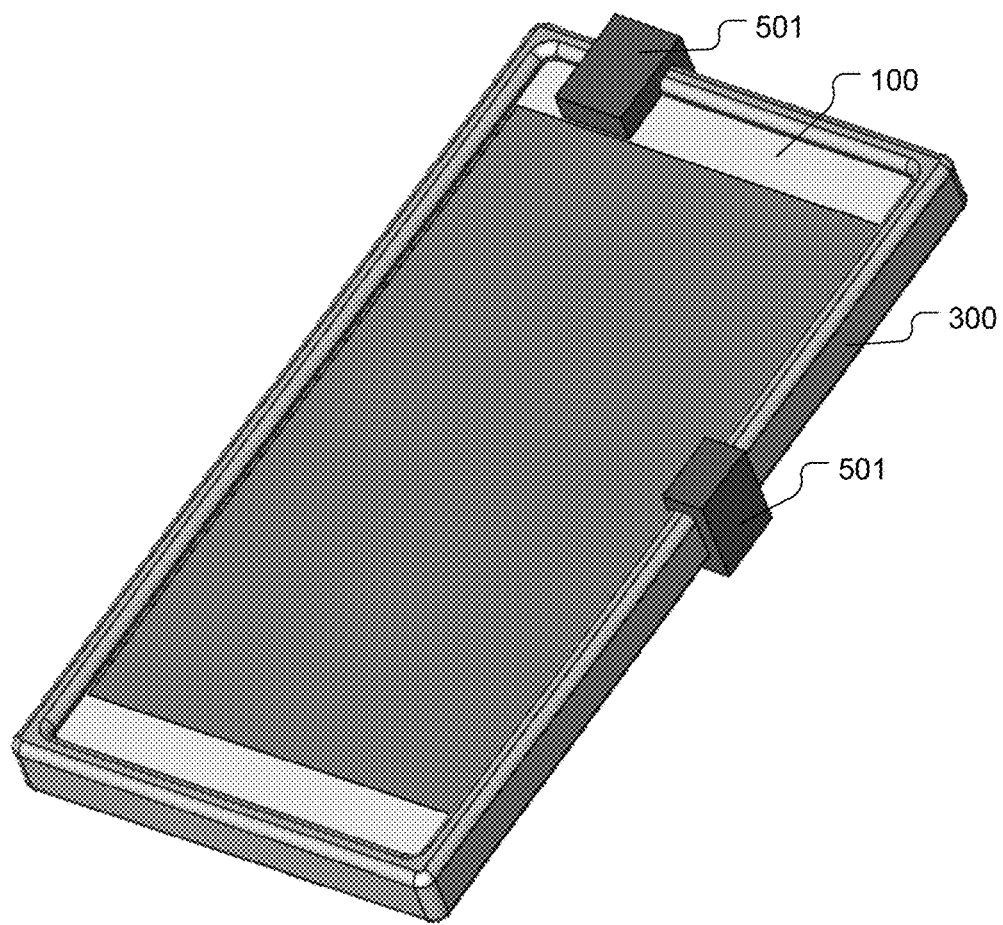
FIG. 5D shows a front view of the electronic device installed in the case with the optical conveyance system attached to the case, in accordance with some embodiments of the present invention.
Figure 5E:
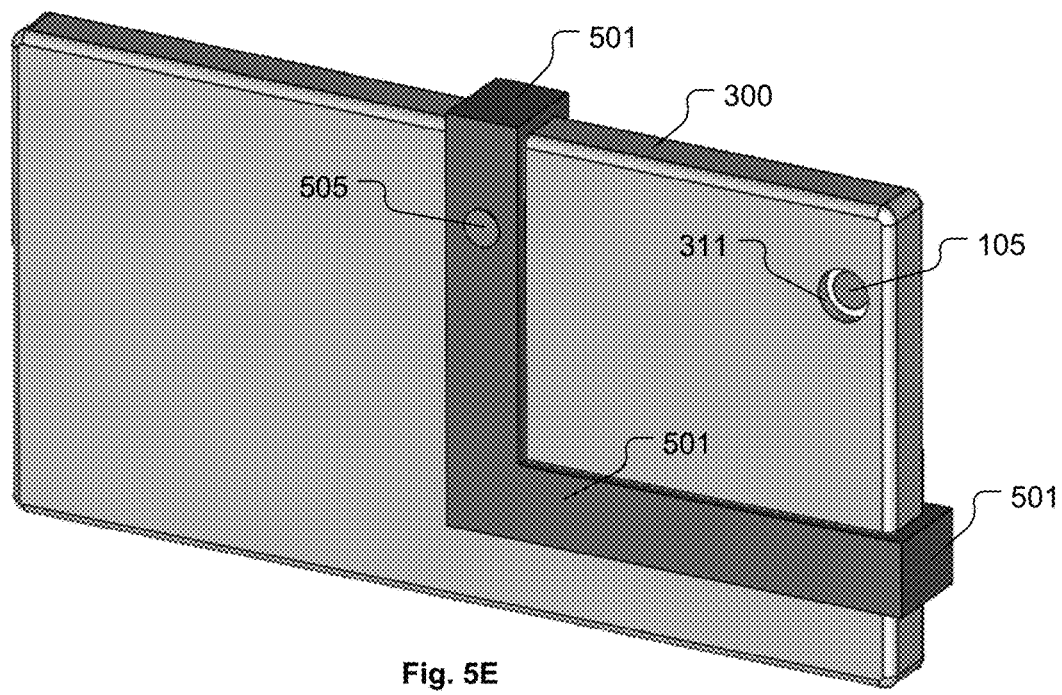
FIG. 5E shows a back view of the electronic device installed in the case with the optical conveyance system attached to the case, in accordance with some embodiments of the present invention.
Figure 5F:
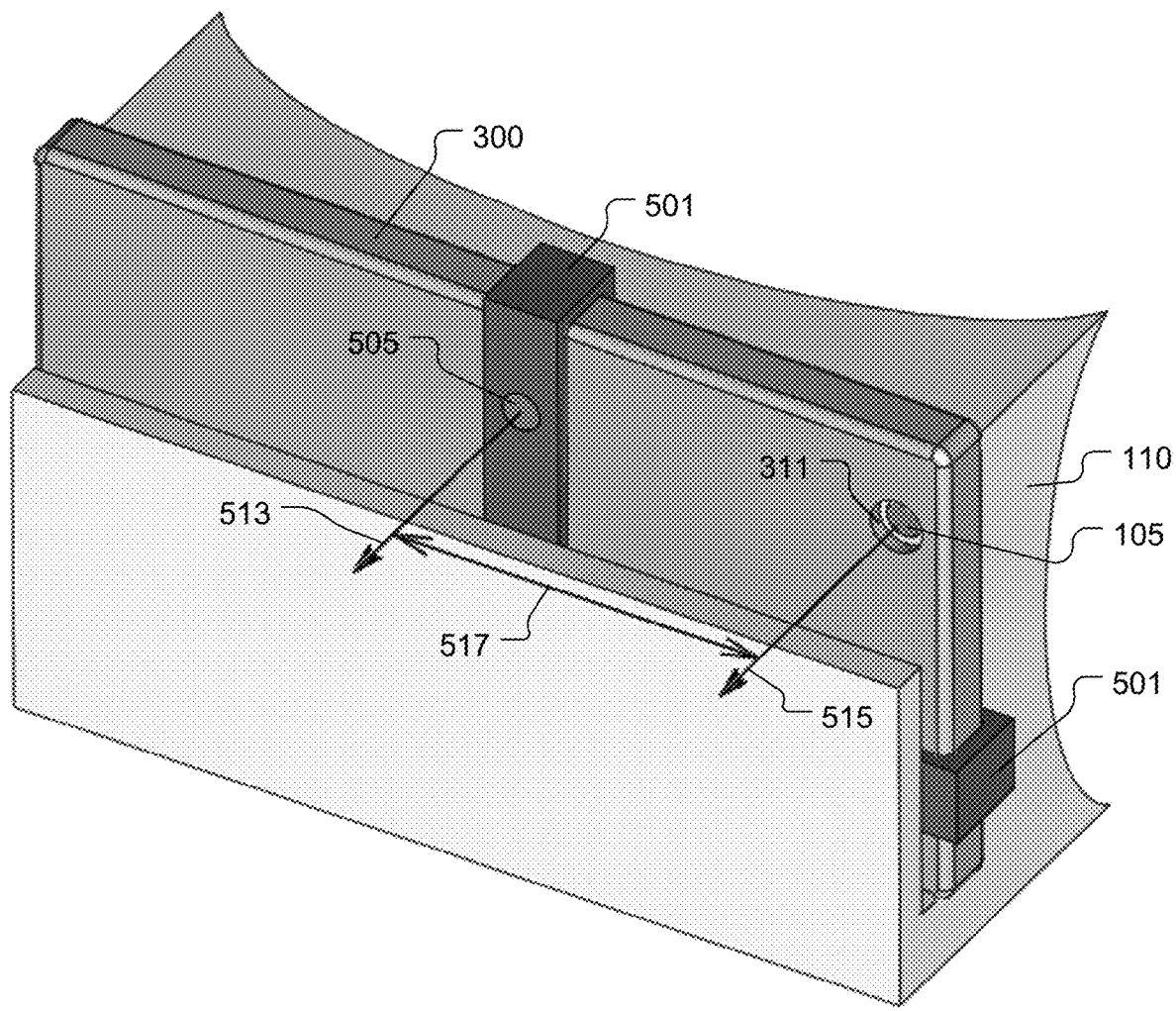
FIG. 5F shows the combination of the electronic device, the case, and the optical conveyance system inserted within the HMD, in accordance with some embodiments of the present invention.

FIG. 5D shows a front view of the electronic device 100 installed in the case 300 with the optical conveyance system 501 attached to the case 300, in accordance with some embodiments of the present invention. FIG. 5E shows a back view of the electronic device 100 installed in the case 300 with the optical conveyance system 501 attached to the case 300, in accordance with some embodiments of the present invention. FIG. 5F shows the combination of the electronic device 100, the case 300, and the optical conveyance system 501 inserted within the HMD 110, in accordance with some embodiments of the present invention. The HMD 110 in this embodiment is configured to provide a clear view for both the backside camera 105 of the electronic device 100 and the optical receiver 505. The optical receiver 505 is spatially oriented and exposed to have an optical view axis 513 substantially parallel to an optical view axis 515 of the backside camera 105. A separation distance 517 is measured perpendicularly between the optical view axis 513 of the optical receiver 505 and the optical view axis 515 of the backside camera 105. In some embodiments, the separation distance 517 is about 63 millimeters (mm), which corresponds to the average distance between pupils of adult human eyes. However, in other embodiments, the separation distance 517 can be either less than or greater than 63 mm.

Figure 6A:
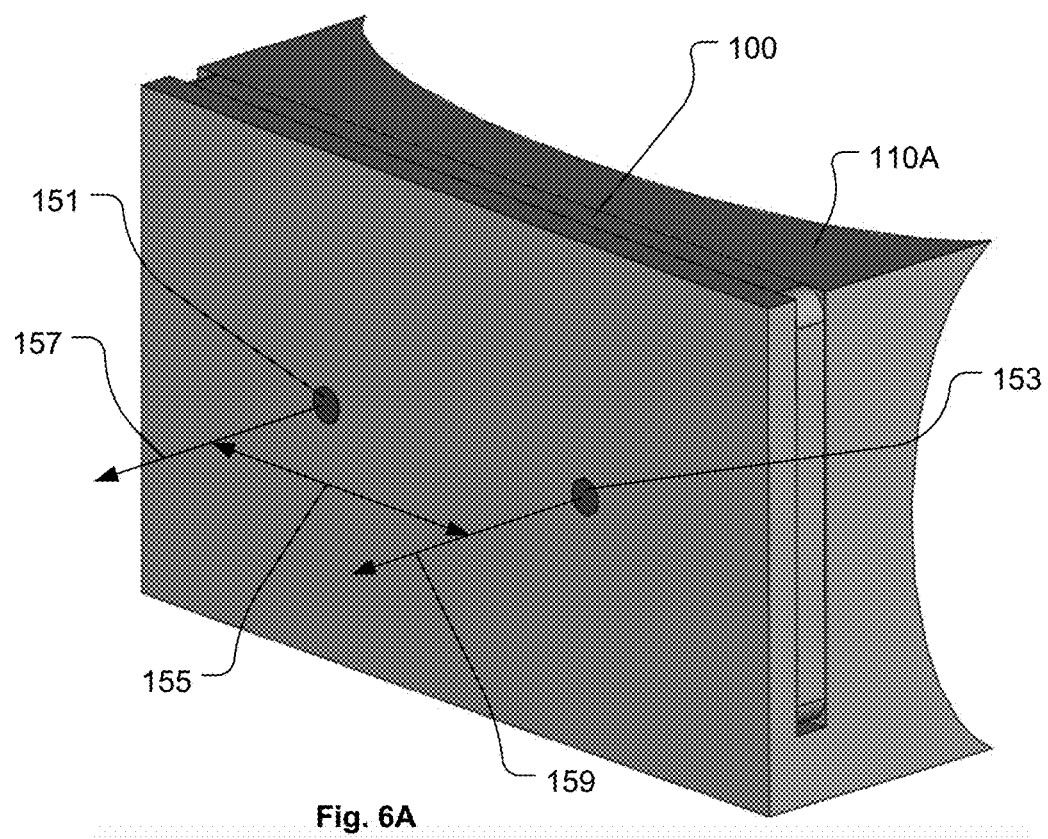
FIG. 6A shows a perspective view of an HMD having two optical receivers for frontside and backside cameras of the electronic device inserted in the HMD, in accordance with some embodiments of the present invention.

FIG. 6A shows a perspective view of an HMD 110A with the electronic device 100 inserted in the HMD 110A, in accordance with some embodiments of the present invention. In the configuration of FIG. 6A, the HMD 110A includes an optical receiver 151 and an optical receiver 153. The optical receivers 151 and 153 are separated from each other by a distance 155. The optical receiver 151 is optically connected to the frontside camera 103 of the electronic device 100 such that visual input received through the optical receiver 151 is optically conveyed to the frontside camera 103. Similarly, the optical receiver 153 is optically connected to the backside camera 105 of the electronic device 100 such that visual input received through the optical receiver 153 is optically conveyed to the backside camera 105. The optical receiver 151 is spatially oriented and exposed to have an optical view axis 157. The optical receiver 153 is spatially oriented and exposed to have an optical view axis 159. The separation distance 155 is measured perpendicularly between the optical view axis 157 of the optical receiver 151 and the optical view axis 159 of the optical receiver 153. In some embodiments, the separation distance 155 is about 63 mm, which corresponds to an average distance between pupils of adult human eyes. However, in other embodiments, the separation distance 155 can be either less than or greater than 63 mm. And, in some embodiments, the position of the optical receiver 151 relative to the optical receiver 153 is adjustable, so that the separation distance 155 is adjustable. Also, it should be appreciated that the vertical positions of the optical receivers 151 and 153, i.e., vertical positions above the floor, can be substantially aligned so as to substantially match the respective vertical positions of the user's eyes.

In some embodiments, the optical receivers 151 and 153 are positioned within the HMD 110A so that when the HMD 110A is worn by the user, the optical view axes 157 and 159 of the optical receivers 151 and 153 will be substantially aligned with respective eyes of the user. In this configuration, the visual input received through the optical receiver 151 and conveyed to the frontside camera 103 will be substantially equivalent to visual input that would normally be received through the right eye of the user in the absence of the HMD 110A. And, the visual input received through the optical receiver 153 and conveyed to the backside camera 105 will be substantially equivalent to visual input that would normally be received through the left eye of the user in the absence of the HMD 110A. In this manner, the visual input provided to the user's eyes through the optical receivers 151 and 153, the frontside camera 103, and the backside camera 105 can effectively represent the visual input that would normally be seen by the user's eyes in the absence of the HMD 110A, thereby providing the user with an ability to see the real world through the HMD 110A in a more realistic manner when wearing and using the HMD 110A. It should be appreciated that positioning of the optical receivers 151 and 153 to substantially align with the eyes of the user provides improved stereoscopic placement of visual inputs that get conveyed to the frontside camera 103 and the backside camera 105, which enables substantial matching of the user's real-world vision.

Figure 6B:
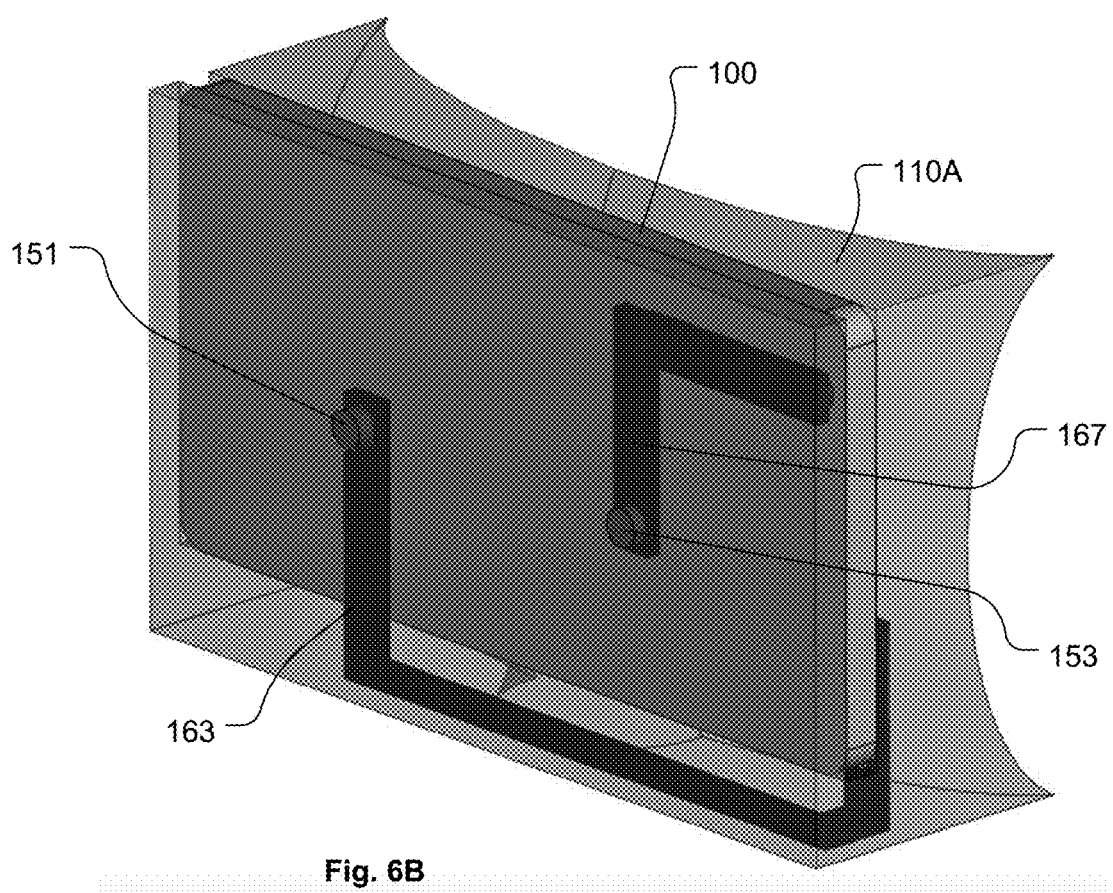
FIG. 6B shows a transparent view of the HMD of FIG. 6A from a front perspective, in accordance with some embodiments of the present invention.
Figure 6C:
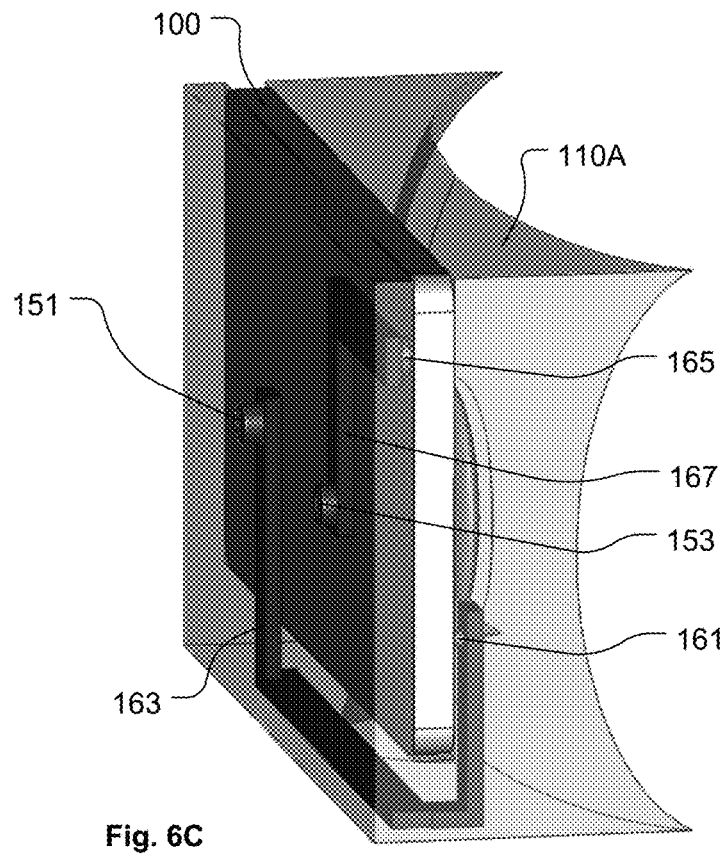
FIG. 6C shows a transparent view of the HMD of FIG. 6A from a side perspective, in accordance with some embodiments of the present invention.
Figure 6D:
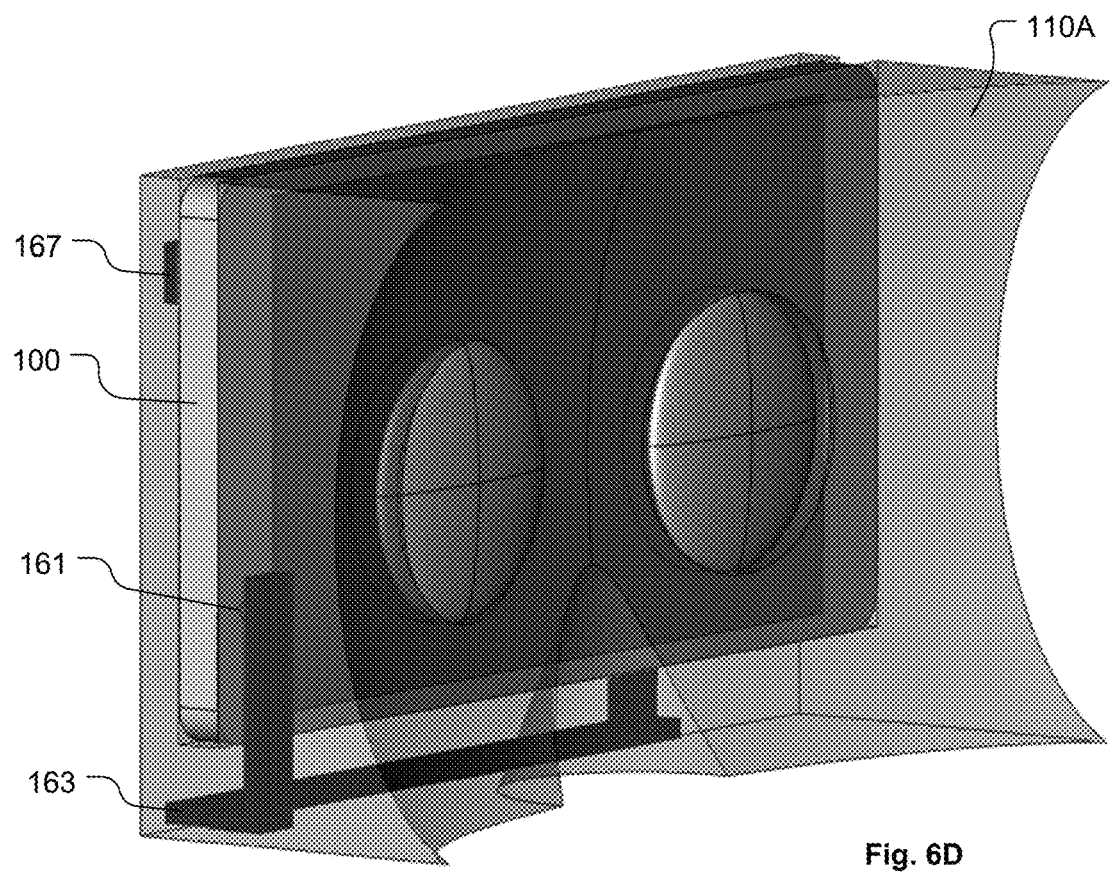
FIG. 6D shows a transparent view of the HMD of FIG. 6A from a back perspective, in accordance with some embodiments of the present invention.

FIG. 6B shows a transparent view of the HMD 110A from a front perspective, in accordance with some embodiments of the present invention. FIG. 6C shows a transparent view of the HMD 110A from a side perspective, in accordance with some embodiments of the present invention. FIG. 6D shows a transparent view of the HMD 110A from a back perspective, in accordance with some embodiments of the present invention. The optical receiver 151 is optically connected to an optical output 161 through an optical conveyance device 163. Also, the optical receiver 153 is optically connected to an optical output 165 through an optical conveyance device 167. It should be understood that in some embodiments the HMD 110A can include additional circuitry and components that are not shown in the transparent views of FIGS. 6B-6D in order to avoid obscuring embodiments of the present invention. In some embodiments, one or both of the optical conveyance devices 163 and 167 can include a combination of mirrors, waveguides, and/or prisms for projecting the visual input received through the optical receivers 151 and 153, respectively, onto lenses of the frontside camera 103 and the backside camera 105, respectively. In some embodiments, one or both of the optical conveyance devices 163 and 167 can include a bundle of optical fibers configured to transmit light received through the optical receivers 151 and 153, respectively, around to the optical outputs 161 and 165, respectively. It should be understood that in various embodiments, the optical conveyance device 163 can be configured in different ways, so long as the visual input received through the optical receiver 151 is transmitted through the optical output 161 and onto the lens of the frontside camera 103 so as to obtain the same effect as if the frontside camera 103 were positioned and oriented in the same manner as the optical receiver 151. Similarly, it should be understood that in various embodiments, the optical conveyance device 167 can be configured in different ways, so long as the visual input received through the optical receiver 153 is transmitted through the optical output 165 and onto the lens of the backside camera 105 so as to obtain the same effect as if the backside camera 105 were positioned and oriented in the same manner as the optical receiver 153.

In some embodiments, the optical conveyance devices 163 and 167 can be fully integrated within the HMD 110A so as to not be exposed outside of the HMD 110A. However, in some embodiments, a portion of one or both of the optical conveyance devices 163 and 167 can be exposed at the exterior surface of the HMD 110A. For example, if the optical conveyance device 163/167 includes a focusing component, that focusing component may be exposed at the exterior surface of the HMD 110A to provide for focus adjustment. Also, it should be understood that one or both of the optical conveyance devices 163 and 167 can include optical components, such as optical amplifiers, optical splitters, optical combiners, etc., as needed to accomplish conveyance of the visual input received through the optical receivers 151 and 153, respectively, around to the optical outputs 161 and 165, respectively.

In accordance with the foregoing, an optical conveyance system for relocating a visual input position of an electronic device is disclosed herein. The electronic device (100) has a frontside camera (103) and a backside camera (105) respectively positioned on opposite sides of the electronic device (100). The optical conveyance system includes an optical receiver (121, 305, 405, 505) configured to receive visual input. The optical receiver (121, 305, 405, 505) is positioned to have a field of view that overlaps a field of view of the backside camera (105) of the electronic device (100). The optical conveyance system also includes an optical output (129, 309, 409, 509) configured to project visual output. The optical output (129, 309, 409, 509) is positioned over the frontside camera (103) of the electronic device (100) to project visual output into the frontside camera (103) of the electronic device (100). The optical conveyance system also includes an optical conveyance device (131, 307, 407, 507) optically connected between the optical receiver (121, 305, 405, 505) and the optical output (129, 309, 409, 509). The optical conveyance device (131, 307, 407, 507) is configured to convey the visual input received through the optical receiver (121, 305, 405, 505) to the optical output (129, 309, 409, 509) for projection as the visual output into the frontside camera (103) of the electronic device (100).

In some embodiments, the optical receiver (121, 305, 405, 505) includes a camera lens for receiving the visual input. In some embodiments, the optical output (129, 309, 409, 509) includes a lens for projecting the visual output into the frontside camera (103) of the electronic device (100). In some embodiments, the optical conveyance device (131, 307, 407, 507) includes a combination of optical components, where the optical components can include one or more of a mirror, a waveguide, a prism, and an optical fiber. In some embodiments, the combination of optical components is configured such that the visual output projected into the frontside camera (103) of the electronic device (100) is equivalent to the visual input received through the optical receiver (121, 305, 405, 505) as if the frontside camera (103) of the electronic device (100) were positioned and oriented in a same manner as the optical receiver (121, 305, 405, 505). In some embodiments, the optical conveyance device (131, 307, 407, 507) traverses through at least two orthogonal changes in direction between the optical receiver (121, 305, 405, 505) and the optical output (129, 309, 409, 509).

In some embodiments, the optical receiver (121), the optical conveyance device (131), and the optical output (129) are integrated within a head-mounted display device (110). In some embodiments, the head-mounted display device (110) is configured to optically transform images displayed on a display screen (101) of the electronic device (100) into immersive visual content. In some embodiments, the head-mounted display device (110) is configured to receive and hold the electronic device (100) in a position in which an optical view axis (125) of the optical receiver (121) is substantially parallel to and commonly oriented with an optical view axis (127) of the backside camera (105) of the electronic device (100), and in which the optical output (129) is positioned over the frontside camera (103) of the electronic device (100). In some embodiments, a separation distance (123) measured perpendicularly between the optical view axis (125) of the optical receiver (121) and the optical view axis (127) of the backside camera (105) is about 63 millimeters. In some embodiments, the separation distance (123) measured perpendicularly between the optical view axis (125) of the optical receiver (121) and the optical view axis (127) of the backside camera (105) is adjustable.

In some embodiments, the optical receiver (305), the optical conveyance device (307), and the optical output (309) are integrated within a case (300) for the electronic device (100), such that when the electronic device (100) is inserted into the case (300) the optical output (309) covers the frontside camera (103) of the electronic device (100) and an optical view axis (313) of the optical receiver (305) is substantially parallel to and commonly oriented with an optical view axis (315) of the backside camera (105) of the electronic device (100). In some embodiments, with the optical receiver (305), the optical conveyance device (307), and the optical output (309) integrated within the case (300) for the electronic device (100), a separation distance (317) measured perpendicularly between the optical view axis (313) of the optical receiver (305) and the optical view axis (315) of the backside camera (105) is about 63 millimeters when the electronic device (100) is inserted into the case (300). In some embodiments, with the optical receiver (305), the optical conveyance device (307), and the optical output (309) integrated within the case (300) for the electronic device (100), the separation distance (317) measured perpendicularly between the optical view axis (313) of the optical receiver (305) and the optical view axis (315) of the backside camera (105) is adjustable. In some embodiments, the case (300) with the electronic device (100) inserted into the case (300) is installed within a head-mounted display device (110). In these embodiments, the head-mounted display device (110) is configured to optically transform images displayed on a display screen (101) of the electronic device (100) into immersive visual content.

In some embodiments, the optical receiver (405, 505), the optical conveyance device (407, 507), and the optical output (409, 509) are integrated within a clip (401, 501) configured to attach to the electronic device (100). The clip (401, 501) is configured such that when the clip (401, 501) is attached to the electronic device (100) the optical output (409, 509) covers the frontside camera (103) of the electronic device (100) and an optical view axis (413, 513) of the optical receiver (405, 505) is substantially parallel to and commonly oriented with an optical view axis (415, 515) of the backside camera (105) of the electronic device (100). In some embodiments, a separation distance (417, 517) measured perpendicularly between the optical view axis (413, 513) of the optical receiver (405, 505) and the optical view axis (415, 515) of the backside camera (105) is about 63 millimeters when the clip (401, 501) is attached to the electronic device (100). In some embodiments, the separation distance (417, 517) measured perpendicularly between the optical view axis (413, 513) of the optical receiver (405, 505) and the optical view axis (415, 515) of the backside camera (105) is adjustable. In some embodiments, the clip (501) is configured to fit over a case (300) for the electronic device (100). In some embodiments, the electronic device (100) with the clip (401, 501) attached to the electronic device (100) is installed within a head-mounted display device (110). The head-mounted display device (110) is configured to optically transform images displayed on a display screen (101) of the electronic device (100) into immersive visual content.

Figure 7:
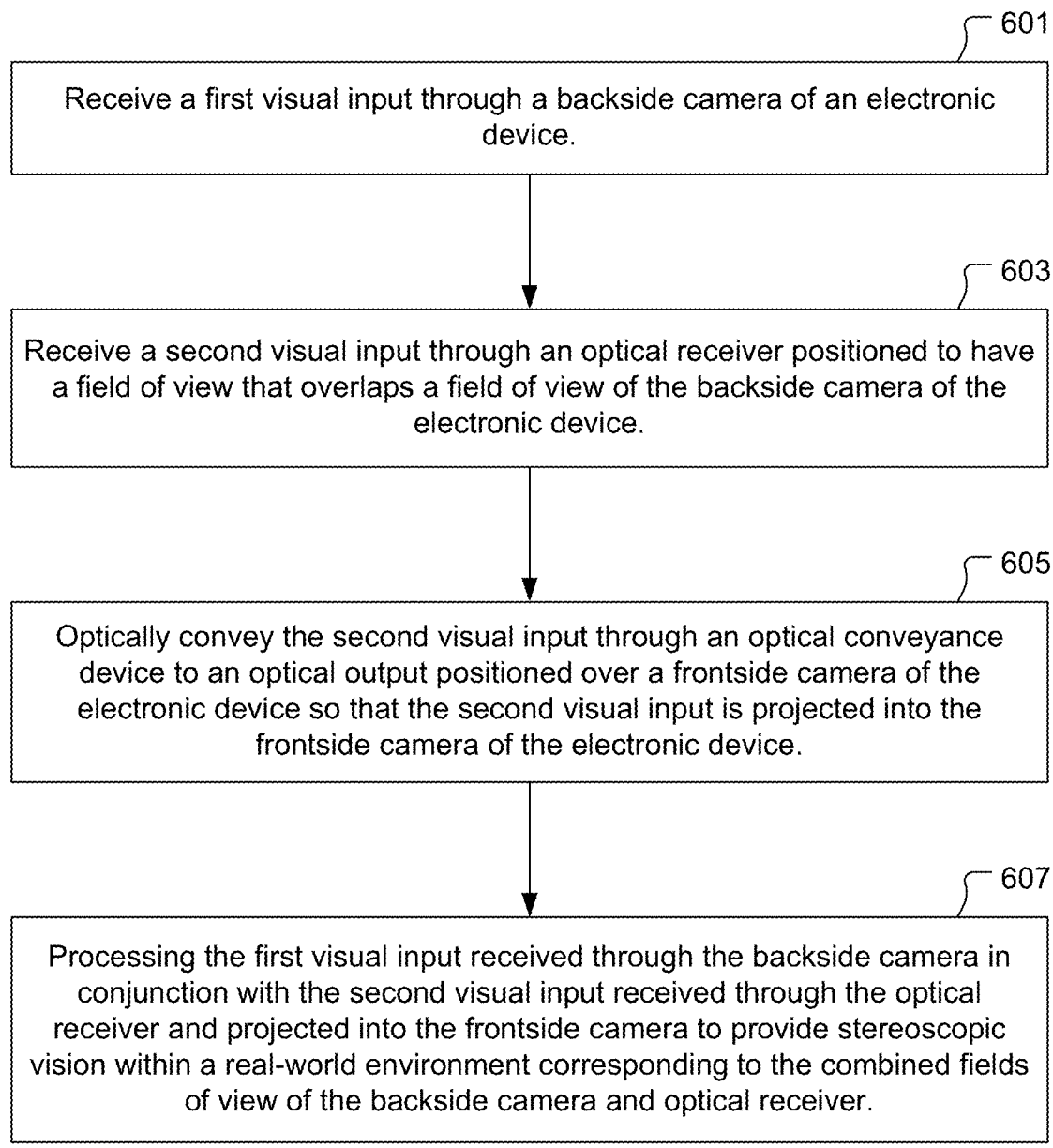
FIG. 7 shows a flowchart of a method for providing stereoscopic vision within a head-mounted display device, in accordance with some embodiments of the present invention.

FIG. 7 shows a flowchart of a method for providing stereoscopic vision within a head-mounted display device (110), in accordance with some embodiments of the present invention. The head-mounted display device (110) includes an electronic device (100) installed within the head-mounted display device (110). The electronic device (100) has a display screen (101) and a frontside camera (103) on a front side of the electronic device (100) and a backside camera (105) on a back side of the electronic device (100). The head-mounted display device (110) is configured to optically present images displayed on a display screen (101) of the electronic device (100) as immersive visual content. The method includes an operation 601 for receiving a first visual input through the backside camera (105) of the electronic device (100). The method also includes an operation 603 for receiving a second visual input through an optical receiver (121, 305, 405, 505) positioned to have a field of view that overlaps a field of view of the backside camera (105) of the electronic device (100). The method also includes an operation 605 for optically conveying the second visual input through an optical conveyance device (131, 307, 407, 507) to an optical output (129, 309, 409, 509) positioned over the frontside camera (103) of the electronic device (100) so that the second visual input is projected into the frontside camera (103) of the electronic device (100). The method also includes an operation 607 for processing the first visual input received through the backside camera (105) in conjunction with the second visual input received through the optical receiver (121, 305, 405, 505) and projected into the frontside camera (103) to provide stereoscopic vision within a real world environment corresponding to the combined fields of view of the backside camera (105) and optical receiver (121, 305, 405, 505).

In some embodiments of the method of FIG. 7, the electronic device (100) is installed within the head-mounted display device (110) in a position in which an optical view axis (125, 313, 413, 513) of the optical receiver (121, 305, 405, 505) is substantially parallel to and commonly oriented with an optical view axis (127, 315, 415, 515) of the backside camera (105) of the electronic device (100). In some embodiments of the method of FIG. 7, a separation distance (123, 317, 417, 517) measured perpendicularly between the optical view axis (125, 313, 413, 513) of the optical receiver (121, 305, 405, 505) and the optical view axis (127, 315, 415, 515) of the backside camera (105) is about 63 millimeters. In some embodiments, the method of FIG. 7 includes an operation for adjusting the separation distance (123, 317, 417, 517) measured perpendicularly between the optical view axis (125, 313, 413, 513) of the optical receiver (121, 305, 405, 505) and the optical view axis (127, 315, 415, 515) of the backside camera (105).

In some embodiments, the method of FIG. 7 includes an operation for using the stereoscopic vision within the real world environment corresponding to the combined fields of view of the backside camera (105) and optical receiver (121, 305, 405, 505) to identify objects within the real world environment. And, in some embodiments, the method of FIG. 7 includes an operation for using the stereoscopic vision within the real world environment corresponding to the combined fields of view of the backside camera (105) and optical receiver (121, 305, 405, 505) to determine positions and distances to objects identified within the real world environment. In some embodiments, the method of FIG. 7 includes an operation for notifying a user of the head-mounted display device (110) of one or more of the identification of objects within the real world environment, the position of objects within the real world environment, and the distance to objects within the real world environment.

In some embodiments, the method of FIG. 7 includes an operation for using the stereoscopic vision within the real world environment corresponding to the combined fields of view of the backside camera (105) and optical receiver (121, 305, 405, 505) for tracking of objects within the real world environment as the head-mounted display device (110) is moved. And, in these embodiments, the method of FIG. 7 can include an operation for using the tracking of objects within the real world environment as the head-mounted display device (110) is moved to assist with navigation of a point of view of a user of the head-mounted display device (110) within the immersive visual content.

Figure 8:
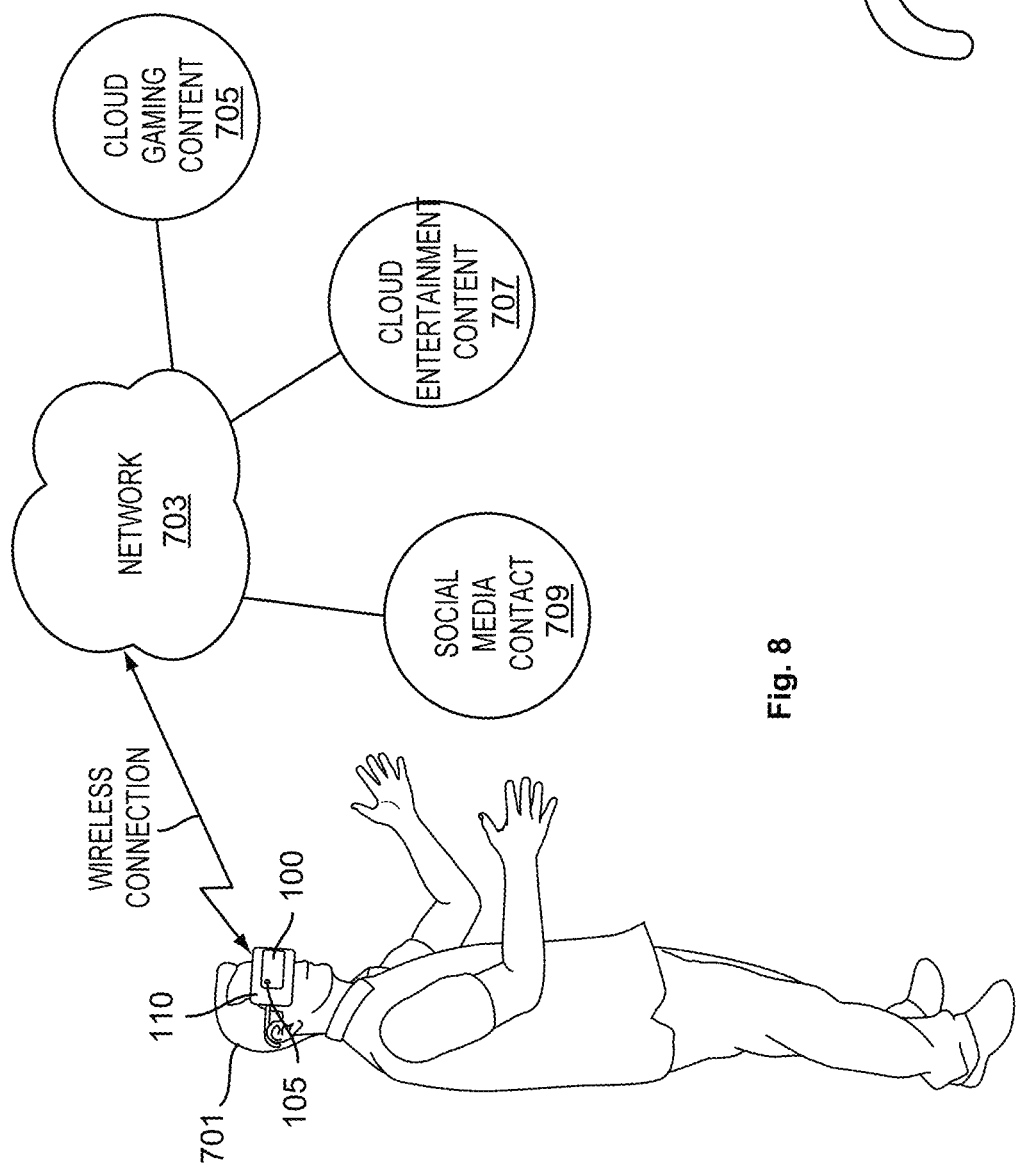
FIG. 8 shows an example of a user wearing the HMD, in accordance with some embodiments of the present invention.

FIG. 8 shows an example of a user 701 wearing the HMD 110, which may include the electronic device 100, e.g., smartphone or the like, held, inserted, clipped, slid into, associated to, or paired to the HMD 110. In some embodiments, the HMD 110 can be a shell-type device that holds the electronic device 100 in place, and provides optics for viewing the display screen 101 of the electronic device 100. In some embodiments, the HMD 110 can be equipped with electronics for communicating with the electronic device 100 when connected, in proximity, or associated to the HMD 110. In the example embodiment shown in FIG. 8, the HMD 110 is shown in the form of glasses, which have the electronic device 100 connected or clipped to the glasses.

In some embodiments, the electronic device 100 can use its native wireless communication circuitry to communicate with a network 703, such as the Internet. The electronic device 100 can communicate to various content sites including cloud gaming content 705, cloud entertainment content 707, social media content 709, or any other type of content that is accessible over the Internet or private networks. In some embodiments, the content being accessed by the electronic device 100 can be downloaded and executed by the electronic device 100 once the content has been received. In some embodiments, the content can be streamed from the Internet source, and delivered to the electronic device 100 when needed. In some embodiments, the content is streamed from a service provider that provides games, content, entertainment content, or other multimedia for consumption by the electronic device 100 when the electronic device 100 is used with the HMD 110.

Figure 9:
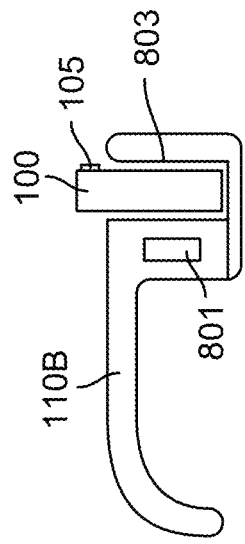
FIG. 9 shows a side view of an HMD configured as a pair of glasses, in accordance with some embodiments of the present invention.

FIG. 9 shows a side view of an HMD 110B configured as a pair of glasses, in accordance with some embodiments of the present invention. The HMD 110B includes electronics 801 for interfacing with the electronic device 100, when the electronic device 100 has been inserted into or is held by the HMD 110B. In various embodiments, the electronics 801 can be configured to communicate with the electronic device 100 using a plug, Bluetooth, Wi-Fi, and/or essentially any other wireless protocol, or wired connection. In this example, the electronic device 100 sits vertically in a slot or holder 803 of the HMD 110B, such that the backside camera 105 of the electronic device 100 faces forward to allow a see-through or pass-through view of the real world environment when the HMD 110B is worn by the user 701. The slot or holder 803 can include any structure for holding, clipping, clamping, securing, attaching, or otherwise maintaining the electronic device 100 in place within the HMD 110B.

The HMD 110B can include optical components positioned between the user's eyes and the display screen 101 of the electronic device 100. The optical components can be configured to provide viewing of the content shown on the display screen 101 of the electronic device 100, and optimize the rendering, sizing, re-sizing, sharpness, prescription, and/or other distortion or non-distortion adjustments of the content shown on the display screen 101.

In some embodiments, activation of a see-through mode (i.e., transparent or semi-transparent mode) is used when the user 701 is interacting with a virtual scene displayed by the electronic device 100 within the HMD 110B. The see-through mode may be activated when the user 701 wishes to disconnect from the virtual scene to interact with another person, take a phone call, pause game, pause session, or conduct an interactive session or communication. The see-through mode can also be automatically triggered, such as when signals are received or when safety alerts or notifications are needed.

Figure 10:
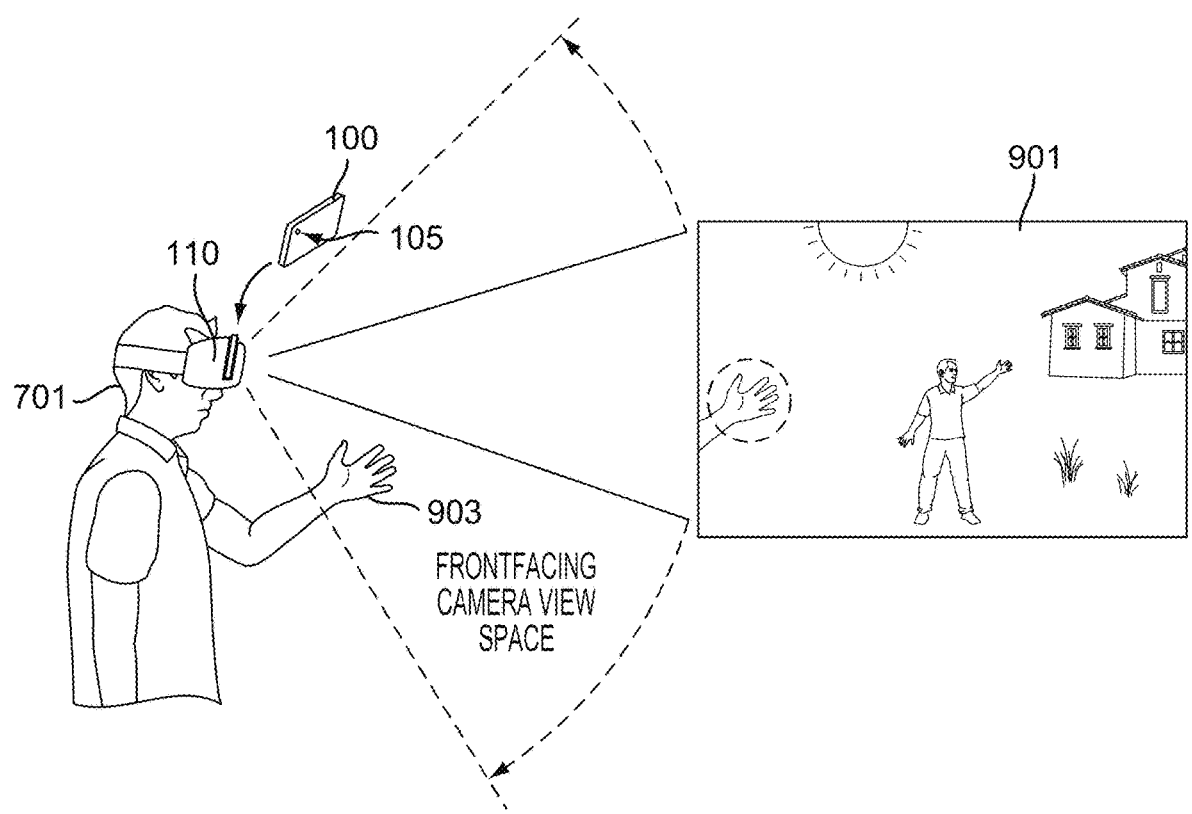
FIG. 10 shows an example of the user wearing the HMD which has received or is about to receive the electronic device, in accordance with some embodiments of the present invention.

FIG. 10 shows an example of the user 701 wearing the HMD 110 which has received or is about to receive the electronic device 100, in accordance with some embodiments of the present invention. In some embodiments, the electronic device 100 is connected to communicate with electronics within the HMD 110 so that the optical components within the HMD 110 can be synchronized with logic, software, and/or firmware of the electronic device 100 for rendering of the visual content shown on the display screen 101 of the electronic device 100 through the optical components to the user 701. In some embodiments, the visual content rendered by the electronic device 100 is virtual reality three-dimensional content, which is delivered to the electronic device 100 through execution of an application on the electronic device 100 and/or by streaming of data from a website, service, service provider, content provider, entertainment provider, or the like.

In some embodiments, the visual content shown on the display screen 101 of the electronic device 100 defines a virtual reality scene, such as the example virtual reality scene 901. In some embodiments, both the backside camera 105 of the electronic device 100 and the optical receiver (121, 305, 405, 505) can be operated to monitor a forward view of the real world from the HMD 110 to assist the user 701 in interacting with the virtual reality scene, such as by allowing the user 701 to place an image of their hand 903 into the virtual reality scene 901 to interact with the content in the virtual reality scene 901. The stereoscopic vision provided by the combination of the backside camera 105 of the electronic device 100 and the optical receiver (121, 305, 405, 505) enables depth perception within the real world environment around the user 701, which in turn enables more accurate determination of how physical actions of the user 701 are intended to correspond to virtual interactions of the user within the virtual reality scene 901. For example, the user 701 can position their hand 903 within the real world into the fields of view of the backside camera 105 of the electronic device 100 and the optical receiver (121, 305, 405, 505), and this positioning of the user's hand is detected by software operating on the electronic device 100 to allow blending of a virtual image of the user's hand into the virtual reality scene 901. In various embodiments, the user's hand can be shown in the virtual reality scene 901 as an image of the user's actual hand or as a computer generated image of the user's hand, or as augmented reality, or as a blend of augmented and real-world images. It should be understood that the example discussed above regarding use of the backside camera 105 of the electronic device 100 and the optical receiver (121, 305, 405, 505) to provide stereoscopic vision for detecting the user's hand in the real world and translating that into a position of the user's hand in the virtual reality scene 901 is one of an essentially unlimited number of ways in which the stereoscopic vision as afforded by the present invention can be utilized.

In some embodiments, the backside camera 105 and the combination of the optical conveyance system (i.e., optical receiver (121, 305, 405, 505), optical conveyance device (131, 307, 407, 507), and optical output (129, 309, 409, 509)) and frontside camera 103 provides a stereoscopic view of the real world when the user desires to view the real world and/or exit the virtual reality scene. Also, in some embodiments, the backside camera 105 and the combination of the optical conveyance system and frontside camera 103 provides a stereoscopic view of the real world that can be used to provide safety notifications to the user 701 while the user 701 is interacting with the virtual reality scene 901. For example, if the user 701 walks around a particular real-world space while interacting with the virtual reality scene 901 and is dangerously approaching stairs, a wall, or some other object, the stereoscopic vision can be used to detect those objects/dangers and enable the electronic device 100 to provide a notification to the user 701 within the HMD 110, such as by providing a message, a notification, an alarm, a sound, tactile feedback, or the like, to the user 701.

The backside camera 105 and the combination of the optical conveyance system and frontside camera 103 is useful for providing safety notifications about the real world space around the user 701 when the user 701 becomes immersed in the virtual reality scene 901. The backside camera 105 and the combination of the optical conveyance system and frontside camera 103 can also be used to provide the user 701 with transitions out of the virtual reality scene into the real world space by enabling partially transparent views, fully transparent views, blends of fully and partially transparent views, or partial views that may show actual features that are of interest to the user 701 or may be dangerous when the user 701 is wearing the HMD 110. Additionally, the backside camera 105 and the combination of the optical conveyance system and frontside camera 103 can be used to enable more accurate tracking of movement of the HMD 110.

Figure 11:
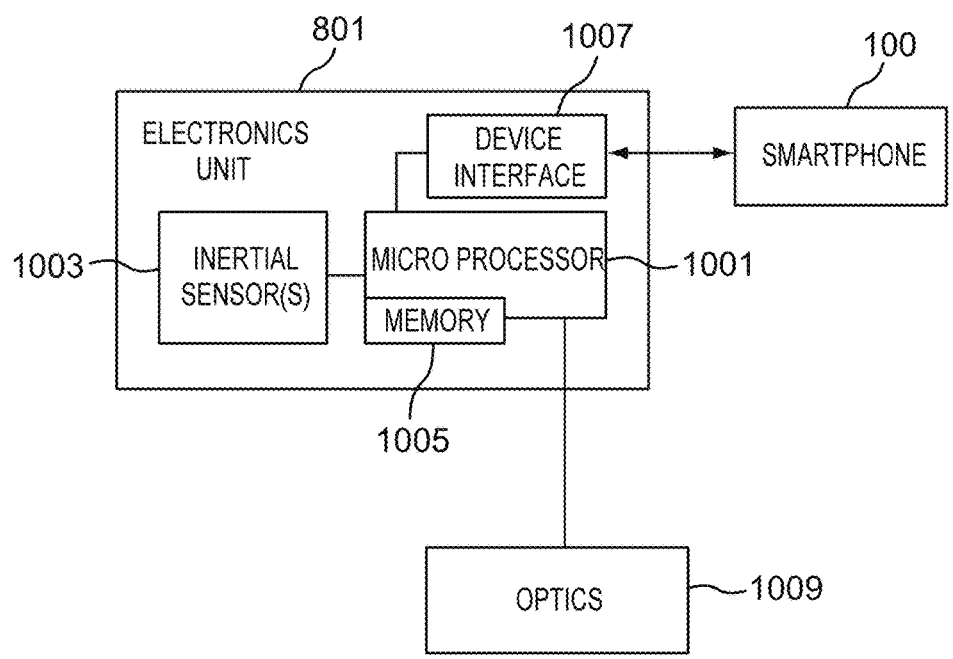
FIG. 11 shows an example of the electronics that may be included within the HMD, in accordance with some embodiments of the present invention.

FIG. 11 shows an example of the electronics 801 that may be included within the HMD 110/110B, in accordance with some embodiments of the present invention. It should be understood that in various embodiments the electronics 801 can include other functionality, circuitry, firmware, logic, processors, memory, etc., than what is depicted in FIG. 11. Therefore, the features shown in FIG. 11 are exemplary, and some systems may include more or fewer devices depending on the implementation. In some embodiments, the electronics 801 can include one or more processor(s) 1001, which can include a graphics processing unit (GPU) and/or general processor. In some embodiments, multiple processors may be provided, and/or multicore processors can be provided. The processor(s) 1001 can be in communication with a device interface 1007 configured to interface with the electronic device 100. The processor(s) 1001 can also be in communication with inertial sensors 1003 that may be part of the HMD 110/110B. The inertial sensors 1003 can collect information for motion, movement, dead reckoning, and tracking. This information can be shared with the processor(s) 1001. The processor(s) 1001 can also be in communication with a computer memory device 1005. In some embodiments, the processor(s) 1001 can also be in communication with optical components 1009 of the HMD 110/110B, for the purpose of controlling the optical components 1009 and/or receiving signals indicating a status of the optical components 1009.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A head-mounted display device including an optical conveyance system for relocating visual input positions of an electronic device, the electronic device having a frontside camera and a backside camera respectively positioned on opposite sides of the electronic device, comprising:
   a first optical receiver integrated within the head-mounted display, the first optical receiver configured to receive a first visual input, the first optical receiver having a first optical view axis substantially aligned with a first eye of a user when the head-mounted display is worn by the user;
   a first optical output integrated within the head-mounted display, the first optical output positioned over the frontside camera of the electronic device, the first optical output configured to project a first visual output into the frontside camera of the electronic device;
   a first optical conveyance device integrated within the head-mounted display, the first optical conveyance device optically connected between the first optical receiver and the first optical output, the first optical conveyance device configured to convey the first visual input received through the first optical receiver to the first optical output for projection as the first visual output into the frontside camera of the electronic device;
   a second optical receiver integrated within the head-mounted display, the second optical receiver configured to receive a second visual input, the second optical receiver having a second optical view axis substantially aligned with a second eye of the user when the head-mounted display is worn by the user;
   a second optical output integrated within the head-mounted display, the second optical output positioned over the backside camera of the electronic device, the second optical output configured to project a second visual output into the backside camera of the electronic device; and
   a second optical conveyance device integrated within the head-mounted display, the second optical conveyance device optically connected between the second optical receiver and the second optical output, the second optical conveyance device configured to convey the second visual input received through the second optical receiver to the second optical output for projection as the second visual output into the backside camera of the electronic device.

2. The head-mounted display device as recited in claim 1, wherein the first optical receiver includes a first camera lens for receiving the first visual input, and wherein the second optical receiver includes a second camera lens for receiving the second visual input.

3. The head-mounted display device as recited in claim 2, wherein the first optical output includes a third camera lens for projecting the first visual output into the frontside camera of the electronic device, and wherein the second optical output includes a fourth camera lens for projecting the second visual output into the backside camera of the electronic device.

4. The head-mounted display device as recited in claim 1, wherein the first optical conveyance device includes a first combination of optical components, the first optical components including one or more of a mirror, a waveguide, a prism, and an optical fiber, and wherein the second optical conveyance device includes a second combination of optical components, the second optical components including one or more of a mirror, a waveguide, a prism, and an optical fiber.

5. The head-mounted display device as recited in claim 4, wherein the first combination of optical components is configured such that the first visual output projected into the frontside camera of the electronic device is equivalent to the first visual input received through the first optical receiver as if the frontside camera of the electronic device were positioned and oriented in a same manner as the first optical receiver, and
   wherein the second combination of optical components is configured such that the second visual output projected into the backside camera of the electronic device is equivalent to the second visual input received through the second optical receiver as if the backside camera of the electronic device were positioned and oriented in a same manner as the second optical receiver.

6. The head-mounted display device as recited in claim 1, wherein the first optical conveyance device traverses through at least two orthogonal changes in direction between the first optical receiver and the first optical output.

7. The head-mounted display device as recited in claim 1, wherein the head-mounted display device is configured to optically transform images displayed on a display screen of the electronic device into immersive visual content.

8. The head-mounted display device as recited in claim 1, wherein the head-mounted display device is configured to receive and hold the electronic device in a position in which the optical view axis of the first optical receiver is substantially parallel to and commonly oriented with the optical view axis of the second optical receiver.

9. The head-mounted display device as recited in claim 8, wherein a separation distance measured perpendicularly between the first optical view axis of the first optical receiver and the second optical view axis of the second optical receiver is about 63 millimeters.

10. The head-mounted display device as recited in claim 8, wherein a separation distance measured perpendicularly between the first optical view axis of the first optical receiver and the second optical view axis of the second optical receiver is adjustable.

11. The head-mounted display device as recited in claim 1, wherein a combination of the first optical receiver, the first optical output, and the first optical conveyance device provides optical properties that substantially match optical properties of a lens of the backside camera.

12. The head-mounted display device as recited in claim 1, wherein a combination of the first optical receiver, the first optical output, and the first optical conveyance device provides optical properties that are different from optical properties of a lens of the backside camera.

13. The head-mounted display device as recited in claim 1,
wherein the second optical receiver is positioned to have a field of view that overlaps a field of view of the first optical receiver.

14. A method for providing stereoscopic vision within a head-mounted display device, the head-mounted display device having an electronic device installed within the head-mounted display device, the electronic device having a display screen and a frontside camera on a front side of the electronic device and a backside camera on a back side of the electronic device, the head-mounted display device configured to optically present images displayed on the display screen of the electronic device as immersive visual content, comprising:
receiving a first visual input through a first optical receiver integrated within the head-mounted display, the first optical receiver having a first optical view axis substantially aligned with a first eye of a user when the head-mounted display is worn by the user;
receiving a second visual input through a second optical receiver integrated within the head-mounted display, the second optical receiver having a second optical view axis substantially aligned with a second eye of the user when the head-mounted display is worn by the user;
optically conveying the first visual input through a first optical conveyance device to a first optical output positioned over the frontside camera of the electronic device so that the first visual input is projected into the frontside camera of the electronic device, the first optical conveyance device and the first optical output integrated within the head-mounted display;
optically conveying the second visual input through a second optical conveyance device to a second optical output positioned over the backside camera of the electronic device so that the second visual input is projected into the backside camera of the electronic device, the second optical conveyance device and the second optical output integrated within the head-mounted display;
processing the first visual input projected into the frontside camera in conjunction with the second visual input projected into the backside camera to provide stereoscopic vision within a real world environment corresponding to the combined fields of view of the first optical receiver and the second optical receiver.

15. The method as recited in claim 14, wherein the first optical view axis of the first optical receiver is substantially parallel to and commonly oriented with the second optical view axis of the second optical receiver.

16. The method as recited in claim 15, wherein a separation distance measured perpendicularly between the first optical view axis of the first optical receiver and the second optical view axis of the second optical receiver is about 63 millimeters.

17. The method as recited in claim 15, further comprising:
adjusting a separation distance measured perpendicularly between the first optical view axis of the first optical receiver and the second optical view axis of the second optical receiver.

18. The method as recited in claim 14, further comprising:
using the stereoscopic vision within the real world environment corresponding to the combined fields of view of the first optical receiver and the second optical receiver to identify objects within the real world environment.

19. The method as recited in claim 18, further comprising:
using the stereoscopic vision within the real world environment corresponding to the combined fields of view of the first optical receiver and the second optical receiver to determine positions and distances to objects identified within the real world environment.

20. The method as recited in claim 19, further comprising:
notifying the user of the head-mounted display device of one or more of the identification of objects within the real world environment, the position of objects within the real world environment, and the distance to objects within the real world environment.

21. The method as recited in claim 14, further comprising:
using the stereoscopic vision within the real world environment corresponding to the combined fields of view of the first optical receiver and the second optical receiver for tracking of objects within the real world environment as the head-mounted display device is moved; and
using the tracking of objects within the real world environment as the head-mounted display device is moved to assist with navigation of a point of view of the user of the head-mounted display within the immersive visual content.

* * * * *